United States Patent
Wang et al.

(10) Patent No.: US 10,425,410 B2
(45) Date of Patent: Sep. 24, 2019

(54) IDENTITY AUTHENTICATION METHOD AND APPARATUS, AND USER EQUIPMENT

(71) Applicant: Huawei Technologies Co., Ltd., Shenzhen (CN)

(72) Inventors: Chan Wang, Shenzhen (CN); Huangwei Wu, Shenzhen (CN); Xi Huang, Shenzhen (CN); Wenjuan Chen, Shenzhen (CN); Yu Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 15/515,496

(22) PCT Filed: Sep. 30, 2014

(86) PCT No.: PCT/CN2014/088021
§ 371 (c)(1),
(2) Date: Mar. 29, 2017

(87) PCT Pub. No.: WO2016/049898
PCT Pub. Date: Apr. 7, 2016

(65) Prior Publication Data
US 2017/0230362 A1 Aug. 10, 2017

(51) Int. Cl.
*G06F 21/00* (2013.01)
*H04L 29/06* (2006.01)
*H04L 9/32* (2006.01)
*G06F 21/32* (2013.01)
(Continued)

(52) U.S. Cl.
CPC .......... *H04L 63/0861* (2013.01); *G06F 21/32* (2013.01); *H04L 9/32* (2013.01); *H04L 63/083* (2013.01); *H04L 63/105* (2013.01); *H04L 63/107* (2013.01); *H04W 12/06* (2013.01);
(Continued)

(58) Field of Classification Search
CPC . H04L 63/0861; H04L 63/105; H04L 63/083; H04L 63/107; H04L 2463/082; H04W 12/08; H04W 12/06
See application file for complete search history.

(56) References Cited

U.S. PATENT DOCUMENTS

2010/0048167 A1 2/2010 Chow et al.
2010/0162386 A1* 6/2010 Li ........................... G06F 21/32
726/19
(Continued)

FOREIGN PATENT DOCUMENTS

| CN | 101350811 A | 1/2009 |
|---|---|---|
| CN | 102483845 A | 5/2012 |
| CN | 103049704 A | 4/2013 |

(Continued)

*Primary Examiner* — Kendall Dolly
(74) *Attorney, Agent, or Firm* — Slater Matsil, LLP

(57) ABSTRACT

An identity authentication method includes detecting a scenario in which the user equipment is located, determining, from at least two different authentication levels of the user equipment, an authentication level corresponding to the scenario in which the user equipment is located, acquiring current biometric feature data entered by a user, and determining, according to the current biometric feature data, preconfigured biometric feature data, and the authentication level, whether identity authentication succeeds.

16 Claims, 7 Drawing Sheets

(51) Int. Cl.
*H04W 12/06* (2009.01)
*H04W 12/08* (2009.01)

(52) U.S. Cl.
CPC ..... *H04W 12/08* (2013.01); *G06F 2221/2111* (2013.01); *H04L 2463/082* (2013.01)

(56) References Cited

U.S. PATENT DOCUMENTS

| | | |
|---|---|---|
| 2012/0169464 A1 | 7/2012 | Aoki et al. |
| 2013/0290136 A1 | 10/2013 | Sheets et al. |

FOREIGN PATENT DOCUMENTS

| | | | |
|---|---|---|---|
| CN | 103096512 A | 5/2013 | |
| CN | 103136533 A | 6/2013 | |
| CN | 103888255 A | 6/2014 | |
| EP | 2743873 A1 | 6/2014 | |
| WO | 2013131265 A1 | 9/2013 | |
| WO | WO-2013131265 A1 * | 9/2013 | ......... H04L 63/0876 |
| WO | 2013155143 A1 | 10/2013 | |

\* cited by examiner

IDENTITY AUTHENTICATION METHOD AND APPARATUS, AND USER EQUIPMENT

CROSS-REFERENCE TO RELATED APPLICATIONS

This patent application is a national phase filing under section 371 of PCT/CN2014/088021, filed Sep. 30, 2014 which is incorporated herein by reference in its entirety.

TECHNICAL FIELD

The present invention relates to the field of information technologies, and in particular, to an identity authentication method and apparatus, and user equipment.

BACKGROUND

As user equipment is getting smarter, an identity authentication manner of the user equipment becomes increasingly diverse. Common identity authentication manners include password authentication, pattern authentication, peripheral authentication, and biometric feature-based identity authentication. Because the biometric feature-based identity authentication does not require memorization and features high portability, application of this type of authentication manner becomes increasingly common. Biometric feature-based identity authentication manners include fingerprint authentication, face authentication, voiceprint authentication, palmprint authentication, iris authentication, and the like.

Currently, in a biometric feature-based identity authentication method, user equipment first acquires current biometric feature data, then calculates a matching degree between the current biometric feature data and preconfigured biometric feature data, and finally determines whether the matching degree reaches a matching threshold, where if the matching degree reaches the matching threshold, it is determined that identity authentication succeeds; or if the matching degree does not reach the matching threshold, it is determined that identity authentication fails.

However, when it is determined whether the matching degree reaches the matching threshold, a surrounding environment of the user equipment imposes impact, for example, illumination intensity, noise intensity, and temperature in a current environment affect the current biometric feature data, and a location of the user equipment imposes impact, for example, a home, an office, or a restaurant in which the user equipment is located; consequently, the acquired current biometric feature data features relatively low accuracy, resulting in relatively low accuracy of identity authentication.

SUMMARY

The present invention provides an identity authentication method and apparatus, and user equipment, which can improve accuracy of identity authentication.

The technical solutions used in the present invention are as follows.

According to a first aspect, the present invention provides an identity authentication method, executed by user equipment, where the user equipment has a function of biometric feature-based identity authentication, and the identity authentication includes at least two different authentication levels. The method includes detecting a scenario in which the user equipment is located, determining, from the at least two different authentication levels, an authentication level corresponding to the scenario in which the user equipment is located, acquiring current biometric feature data entered by a user; and determining, according to the current biometric feature data, preconfigured biometric feature data, and the authentication level, whether identity authentication succeeds.

With reference to the first aspect, in a first possible implementation manner of the first aspect, the scenario in which the user equipment is located includes a profile mode, a location, or a surrounding environment of the user equipment.

With reference to the first possible implementation manner of the first aspect, in a second possible implementation manner of the first aspect, the authentication level is a matching threshold. The determining, from the at least two different authentication levels, an authentication level corresponding to the scenario in which the user equipment is located specifically includes determining a trust level corresponding to the scenario in which the user equipment is located, and determining, according to the trust level and a correspondence between each trust level and each matching threshold, a matching threshold corresponding to the trust level. The determining, according to the current biometric feature data, preconfigured biometric feature data, and the authentication level, whether identity authentication succeeds specifically includes determining, according to a matching degree between the current biometric feature data and the preconfigured biometric feature data, and the matching threshold, whether identity authentication succeeds.

With reference to the second possible implementation manner of the first aspect, in a third possible implementation manner of the first aspect, the method further includes configuring the correspondence between each trust level and each matching threshold, where the trust level is used to represent a degree to which the user is trusted in a current scenario, and the matching threshold is used to determine whether identity authentication succeeds; and a higher trust level is corresponding to a lower matching threshold.

With reference to the second possible implementation manner of the first aspect, in a fourth possible implementation manner of the first aspect, when the scenario in which the user equipment is located is the profile mode of the user equipment, the method further includes configuring a correspondence between each profile mode and each trust level, before the determining a trust level corresponding to the scenario in which the user equipment is located, the method further includes acquiring a current profile mode of the user equipment. The determining a trust level corresponding to the scenario in which the user equipment is located specifically includes determining the corresponding trust level according to the current profile mode of the user equipment and the correspondence between each profile mode and each trust level.

With reference to the fourth possible implementation manner of the first aspect, in a fifth possible implementation manner of the first aspect, the acquiring a current profile mode of the user equipment includes acquiring profile mode-related parameter information, where the profile mode-related parameter information includes any one or a combination of current location information, current time information, current temperature information, illumination intensity information, or noise intensity information, and acquiring the current profile mode of the user equipment according to the profile mode-related parameter information.

With reference to the second possible implementation manner of the first aspect, in a sixth possible implementation manner of the first aspect, when the scenario in which the user equipment is located is the location of the user equipment, the method further includes configuring a correspondence between each location area and each trust level, before the determining a trust level corresponding to the scenario in which the user equipment is located, the method further includes acquiring a location area in which the user equipment is currently located. The determining a trust level corresponding to the scenario in which the user equipment is located specifically includes determining the corresponding trust level according to the location area in which the user equipment is currently located and the correspondence between each location area and each trust level.

With reference to the sixth possible implementation manner of the first aspect, in a seventh possible implementation manner of the first aspect, before the configuring a correspondence between each location area and each trust level, the method further includes dividing each location area. The dividing each location area includes dividing each location area according to geographical location information, or dividing each location area according to a corresponding base station identifier, or dividing each location area according to an identifier of an accessed Wireless Fidelity WIFI network, or dividing each location area according to an identifier of a paired Bluetooth device, or dividing each location area according to a charging type.

With reference to the second possible implementation manner of the first aspect, in an eighth possible implementation manner of the first aspect, when the scenario in which the user equipment is located is the surrounding environment of the user equipment, the method further includes configuring a correspondence between each environment impact factor and each trust level, where the environment impact factor is used to represent a degree to which identity authentication performed by the user equipment is affected by the surrounding environment, and a larger value of the environment impact factor is corresponding to a higher trust level, before the determining a trust level corresponding to the scenario in which the user equipment is located, the method further includes, acquiring a current environment impact factor of the user equipment, and the determining a trust level corresponding to the scenario in which the user equipment is located specifically includes determining the corresponding trust level according to the current environment impact factor of the user equipment and the correspondence between each environment impact factor and each trust level.

With reference to the eighth possible implementation manner of the first aspect, in a ninth possible implementation manner of the first aspect, the acquiring a current environment impact factor of the user equipment includes acquiring environment impact factor-related parameter information, where the environment impact factor-related parameter information includes any one or a combination of current location information, current time information, current temperature information, illumination intensity information, or noise intensity information, and acquiring the current environment impact factor of the user equipment according to the environment impact factor-related parameter information.

With reference to the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, in a tenth possible implementation manner of the first aspect, the determining, according to a matching degree between the current biometric feature data and the preconfigured biometric feature data, and the matching threshold, whether identity authentication succeeds includes if the matching degree is greater than or equal to the matching threshold, determining that identity authentication succeeds; or if the matching degree is less than the matching threshold, determining that identity authentication fails.

With reference to the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, in an eleventh possible implementation manner of the first aspect, the determining, according to a matching degree between the current biometric feature data and the preconfigured biometric feature data, and the matching threshold, whether identity authentication succeeds specifically includes when the matching degree is greater than or equal to the matching threshold, acquiring an operation type corresponding to a current biometric feature, and determining whether the operation type is the same as a preconfigured operation type, and, if the operation type is the same as the preconfigured operation type, determining that identity authentication succeeds; or if the operation type is different from the preconfigured operation type, determining that identity authentication fails.

With reference to the first aspect or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, or the tenth possible implementation manner of the first aspect, or the eleventh possible implementation manner of the first aspect, in a twelfth possible implementation manner of the first aspect, a manner of the biometric feature-based identity authentication is fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to a second aspect, the present invention provides an identity authentication apparatus, used in user equipment, where the user equipment has a function of biometric feature-based identity authentication, and the identity authentication includes at least two different authentication levels, and the apparatus includes a detection unit, configured to detect a scenario in which the user equipment is located, a determining unit, configured to determine, from the at least two different authentication levels, an authentication level corresponding to the scenario in which the user equipment is located and that is detected by the detection unit, an acquiring unit, configured to acquire current biometric feature data entered by a user, and a judging unit, configured to determine, according to the current biometric feature data acquired by the acquiring unit, preconfigured biometric feature data, and the authentication level determined by the determining unit, whether identity authentication succeeds.

With reference to the second aspect, in a first possible implementation manner of the second aspect, the scenario in which the user equipment is located and that is detected by the detection unit includes a profile mode, a location, or a surrounding environment of the user equipment.

With reference to the first possible implementation manner of the second aspect, in a second possible implementation manner of the second aspect, the authentication level determined by the determining unit is a matching threshold, the determining unit is specifically configured to determine a trust level corresponding to the scenario in which the user equipment is located, the determining unit is further specifically configured to determine, according to the trust level and a correspondence between each trust level and each matching threshold, a matching threshold corresponding to the trust level, and the judging unit is specifically configured to determine, according to a matching degree between the current biometric feature data and the preconfigured biometric feature data, and the matching threshold, whether identity authentication succeeds.

With reference to the second possible implementation manner of the second aspect, in a third possible implementation manner of the second aspect, the apparatus further includes a configuration unit, where the configuration unit is configured to configure the correspondence between each trust level and each matching threshold, where the trust level is used to represent a degree to which the user is trusted in a current scenario, and the matching threshold is used to determine whether identity authentication succeeds; and a higher trust level is corresponding to a lower matching threshold.

With reference to the second possible implementation manner of the second aspect, in a fourth possible implementation manner of the second aspect, when the scenario in which the user equipment is located is the profile mode of the user equipment, the configuration unit is further configured to configure a correspondence between each profile mode and each trust level, the acquiring unit is further configured to acquire a current profile mode of the user equipment, and the determining unit is specifically configured to determine the corresponding trust level according to the current profile mode of the user equipment and the correspondence between each profile mode and each trust level.

With reference to the fourth possible implementation manner of the second aspect, in a fifth possible implementation manner of the second aspect, the acquiring unit is specifically configured to acquire profile mode-related parameter information, where the profile mode-related parameter information includes any one or a combination of current location information, current time information, current temperature information, illumination intensity information, or noise intensity information, and the acquiring unit is further specifically configured to acquire the current profile mode of the user equipment according to the profile mode-related parameter information.

With reference to the second possible implementation manner of the second aspect, in a sixth possible implementation manner of the second aspect, when the scenario in which the user equipment is located is the location of the user equipment, the configuration unit is further configured to configure a correspondence between each location area and each trust level, the acquiring unit is further configured to acquire a location area in which the user equipment is currently located, and the determining unit is specifically configured to determine the corresponding trust level according to the location area in which the user equipment is currently located and the correspondence between each location area and each trust level.

With reference to the sixth possible implementation manner of the second aspect, in a seventh possible implementation manner of the second aspect, the apparatus further includes a dividing unit, where the dividing unit is configured to divide each location area, and the dividing unit is specifically configured to divide each location area according to geographical location information, or the dividing unit is specifically configured to divide each location area according to a corresponding base station identifier, or the dividing unit is specifically configured to divide each location area according to an identifier of an accessed Wireless Fidelity WIFI network, or the dividing unit is specifically configured to divide each location area according to an identifier of a paired Bluetooth device, or the dividing unit is specifically configured to divide each location area according to a charging type.

With reference to the second possible implementation manner of the second aspect, in an eighth possible implementation manner of the second aspect, when the scenario in which the user equipment is located is the surrounding environment of the user equipment, the configuration unit is further configured to configure a correspondence between each environment impact factor and each trust level, where the environment impact factor is used to represent a degree to which identity authentication performed by the user equipment is affected by the surrounding environment, and a larger value of the environment impact factor is corresponding to a higher trust level, the acquiring unit is further configured to acquire a current environment impact factor of the user equipment, and the determining unit is specifically configured to determine the corresponding trust level according to the current environment impact factor of the user equipment and the correspondence between each environment impact factor and each trust level.

With reference to the eighth possible implementation manner of the second aspect, in a ninth possible implementation manner of the second aspect, the acquiring unit is specifically configured to acquire environment impact factor-related parameter information, where the environment impact factor-related parameter information includes any one or a combination of current location information, current time information, current temperature information, illumination intensity information, or noise intensity information, and the acquiring unit is further specifically configured to acquire the current environment impact factor of the user equipment according to the environment impact factor-related parameter information.

With reference to the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, in a tenth possible implementation manner of the second aspect, the judging unit is specifically configured to: when the matching degree is greater than or equal to the matching threshold, determine that identity authentication succeeds; or the judging unit is specifically configured to: when the matching degree is less than the matching threshold, determine that identity authentication fails.

With reference to the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, in an eleventh possible implementation manner of the second aspect, the acquiring unit is further configured to, when the matching degree is greater than or equal to the matching threshold, acquire an operation type corresponding to a current biometric feature, the judging unit is further configured to determine whether the operation type is the same as a preconfigured operation type, and the judging unit is configured to, when the operation type is the same as the preconfigured operation type, determine that identity authentication succeeds; or the judging unit is specifically configured to: when the operation type is different from the preconfigured operation type, determine that identity authentication fails.

With reference to the second aspect or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, or the tenth possible implementation manner of the second aspect, or the eleventh possible implementation manner of the second aspect, in a twelfth possible implementation manner of the second aspect, a manner of the biometric feature-based identity authentication is fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to a third aspect, the present invention provides user equipment, where the user equipment has a function of biometric feature-based identity authentication, and the identity authentication includes at least two different authentication levels. The user equipment includes a processor, configured to detect a scenario in which the user equipment is located, where the processor is further configured to determine, from the at least two different authentication levels, an authentication level corresponding to the scenario in which the user equipment is located, the processor is further configured to acquire current biometric feature data entered by a user, and the processor is further configured to determine, according to the current biometric feature data, preconfigured biometric feature data, and the authentication level, whether identity authentication succeeds.

With reference to the third aspect, in a first possible implementation manner of the third aspect, the scenario in which the user equipment is located and that is detected by the processor includes a profile mode, a location, or a surrounding environment of the user equipment.

With reference to the first possible implementation manner of the third aspect, in a second possible implementation manner of the third aspect, the authentication level determined by the processor is a matching threshold, the processor is specifically configured to determine a trust level corresponding to the scenario in which the user equipment is located, the processor is further specifically configured to determine, according to the trust level and a correspondence between each trust level and each matching threshold, a matching threshold corresponding to the trust level, and the processor is specifically configured to determine, according to a matching degree between the current biometric feature data and the preconfigured biometric feature data, and the matching threshold, whether identity authentication succeeds.

With reference to the second possible implementation manner of the third aspect, in a third possible implementation manner of the third aspect, the processor is further configured to configure the correspondence between each trust level and each matching threshold, where the trust level is used to represent a degree to which the user is trusted in a current scenario, and the matching threshold is used to determine whether identity authentication succeeds, and a higher trust level is corresponding to a lower matching threshold.

With reference to the second possible implementation manner of the third aspect, in a fourth possible implementation manner of the third aspect, when the scenario in which the user equipment is located is the profile mode of the user equipment, the processor is further configured to configure a correspondence between each profile mode and each trust level, the processor is further configured to acquire a current profile mode of the user equipment, andthe processor is configured to determine the corresponding trust level according to the current profile mode of the user equipment and the correspondence between each profile mode and each trust level.

With reference to the fourth possible implementation manner of the third aspect, in a fifth possible implementation manner of the third aspect, the processor is configured to acquire profile mode-related parameter information, where the profile mode-related parameter information includes any one or a combination of current location information, current time information, current temperature information, illumination intensity information, or noise intensity information, and the processor is further configured to acquire the current profile mode of the user equipment according to the profile mode-related parameter information.

With reference to the second possible implementation manner of the third aspect, in a sixth possible implementation manner of the third aspect, when the scenario in which the user equipment is located is the location of the user equipment, the processor is further configured to configure a correspondence between each location area and each trust level, the processor is further configured to acquire a location area in which the user equipment is currently located, and the processor is configured to determine the corresponding trust level according to the location area in which the user equipment is currently located and the correspondence between each location area and each trust level.

With reference to the sixth possible implementation manner of the third aspect, in a seventh possible implementation manner of the third aspect, the processor is configured to divide each location area, and the processor is configured to divide each location area according to geographical location information, or the processor is configured to divide each location area according to a corresponding base station identifier, or the processor is configured to divide each location area according to an identifier of an accessed Wireless Fidelity WIFI network, or the processor is configured to divide each location area according to an identifier of a paired Bluetooth device, or the processor is configured to divide each location area according to a charging type.

With reference to the second possible implementation manner of the third aspect, in an eighth possible implementation manner of the third aspect, when the scenario in which the user equipment is located is the surrounding environment of the user equipment, the processor is further configured to configure a correspondence between each environment impact factor and each trust level, where the environment impact factor is used to represent a degree to which identity authentication performed by the user equipment is affected by the surrounding environment, and a larger value of the environment impact factor is corresponding to a higher trust level, the processor is further configured to acquire a current environment impact factor of the user equipment, and the processor is configured to determine the corresponding trust level according to the current environment impact factor of the user equipment and the correspondence between each environment impact factor and each trust level.

With reference to the eighth possible implementation manner of the third aspect, in a ninth possible implementation manner of the third aspect, the processor is configured to acquire environment impact factor-related parameter information, where the environment impact factor-related parameter information includes any one or a combination of current location information, current time information, current temperature information, illumination intensity information, or noise intensity information; and the processor is further configured to acquire the current environment impact factor of the user equipment according to the environment impact factor-related parameter information.

With reference to the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the ninth possible implementation manner of the third aspect, in a tenth possible implementation manner of the third aspect, the processor is configured to when the matching degree is greater than or equal to the matching threshold, determine that identity authentication succeeds; or the processor is configured to: when the matching degree is less than the matching threshold, determine that identity authentication fails.

With reference to the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the ninth possible implementation manner of the third aspect, in an eleventh possible implementation manner of the third aspect, the processor is further configured to: when the matching degree is greater than or equal to the matching threshold, acquire an operation type corresponding to a current biometric feature, the processor is further configured to determine whether the operation type is the same as a preconfigured operation type, and the processor is configured to when the operation type is the same as the preconfigured operation type, determine that identity authentication succeeds; or the processor is configured to: when the operation type is different from the preconfigured operation type, determine that identity authentication fails.

With reference to the third aspect or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the ninth possible implementation manner of the third aspect, or the tenth possible implementation manner of the third aspect, or the eleventh possible implementation manner of the third aspect, in a twelfth possible implementation manner of the third aspect, a manner of the biometric feature-based identity authentication is fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to a fourth aspect, the present invention provides an identity authentication method, executed by user equipment, where the user equipment has at least two different authentication manners; and the method includes detecting a scenario in which the user equipment is located, determining, from the at least two different authentication manners, a target authentication manner corresponding to the scenario in which the user equipment is located, acquiring current biometric feature data used for the target authentication manner, and determining, according to the current biometric feature data, and preconfigured biometric feature data corresponding to the target authentication manner, whether identity authentication succeeds.

With reference to the fourth aspect, in a first possible implementation manner of the fourth aspect, the determining, from the at least two different authentication manners, a target authentication manner corresponding to the scenario in which the user equipment is located includes acquiring authentication success rates respectively corresponding to the at least two different authentication manners in the scenario in which the user equipment is located, and determining an authentication manner with a highest authentication success rate from the at least two different authentication manners as the target authentication manner according to the authentication success rates respectively corresponding to the at least two different authentication manners.

With reference to the first possible implementation manner of the fourth aspect, in a second possible implementation manner of the fourth aspect, the acquiring authentication success rates respectively corresponding to the at least two different authentication manners in the scenario in which the user equipment is located includes acquiring related parameter information respectively corresponding to the at least two different authentication manners in the scenario in which the user equipment is located, where the related parameter information includes any one or a combination of current location information, current time information, current temperature information, illumination intensity information, or noise intensity information, and acquiring, according to the related parameter information respectively corresponding to the at least two different authentication manners, the authentication success rates respectively corresponding to the at least two different authentication manners.

With reference to the first possible implementation manner of the fourth aspect, in a third possible implementation manner of the fourth aspect, before the acquiring authentication success rates respectively corresponding to the at least two different authentication manners in the scenario in which the user equipment is located, the method further includes acquiring current location information and current time information, sending an authentication success rate request message to a server, where the authentication success rate request message carries the current location information, the current time information, and the at least two different authentication manners, and receiving an authentication success rate response message sent by the server, where the authentication success rate response message carries the authentication success rates respectively corresponding to the at least two different authentication manners, and the acquiring authentication success rates respectively corresponding to the at least two different authentication manners in the scenario in which the user equipment is located includes acquiring the authentication success rates respectively corresponding to the at least two different authentication manners from the authentication success rate response message.

With reference to the first possible implementation manner of the fourth aspect, in a fourth possible implementation manner of the fourth aspect, after the acquiring authentication success rates respectively corresponding to the at least two different authentication manners in the scenario in which the user equipment is located, the method further includes storing a correspondence between the scenario in which the user equipment is located and the authentication success rates respectively corresponding to the at least two different authentication manners.

With reference to the first possible implementation manner of the fourth aspect, in a fifth possible implementation manner of the fourth aspect, the determining, according to the current biometric feature data, and preconfigured biometric feature data corresponding to the target authentication manner, whether identity authentication succeeds includes calculating a matching degree between the current biometric feature data and the preconfigured biometric feature data corresponding to the target authentication manner, determining whether the matching degree is greater than or equal to a matching threshold corresponding to the target authentication manner, and if the matching degree is greater than or equal to the matching threshold, determining that identity authentication succeeds; or if the matching degree is less than the matching threshold, determining that identity authentication fails.

With reference to the fourth aspect or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, in a sixth possible implementation manner of the fourth aspect, the at least two different authentication manners include any combination of fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to a fifth aspect, the present invention provides an identity authentication apparatus, used in user equipment, where the user equipment has at least two different authentication manners; and the apparatus includes a detection unit, configured to detect a scenario in which the user equipment is located, a determining unit, configured to determine, from the at least two different authentication manners, a target authentication manner corresponding to the scenario in which the user equipment is located and that is detected by the detection unit, an acquiring unit, configured to acquire current biometric feature data used for the target authentication manner, and a judging unit, configured to determine, according to the current biometric feature data acquired by the acquiring unit, and preconfigured biometric feature data that is corresponding to the target authentication manner determined by the determining unit, whether identity authentication succeeds.

With reference to the fifth aspect, in a first possible implementation manner of the fifth aspect, the acquiring unit is further configured to acquire authentication success rates respectively corresponding to the at least two different authentication manners in the scenario in which the user equipment is located, and the determining unit is configured to determine an authentication manner with a highest authentication success rate from the at least two different authentication manners as the target authentication manner according to the authentication success rates respectively corresponding to the at least two different authentication manners.

With reference to the first possible implementation manner of the fifth aspect, in a second possible implementation manner of the fifth aspect, the acquiring unit is configured to acquire related parameter information respectively corresponding to the at least two different authentication manners in the scenario in which the user equipment is located, where the related parameter information includes any one or a combination of current location information, current time information, current temperature information, illumination intensity information, or noise intensity information, and the acquiring unit is further configured to acquire, according to the related parameter information respectively corresponding to the at least two different authentication manners, the authentication success rates respectively corresponding to the at least two different authentication manners.

With reference to the first possible implementation manner of the fifth aspect, in a third possible implementation manner of the fifth aspect, the acquiring unit is further configured to acquire current location information and current time information, and the apparatus further includes a sending unit and a receiving unit, where the sending unit is configured to send an authentication success rate request message to a server, where the authentication success rate request message carries the current location information and the current time information that are acquired by the acquiring unit, and the at least two different authentication manners, the receiving unit is configured to receive an authentication success rate response message sent by the server, where the authentication success rate response message carries the authentication success rates respectively corresponding to the at least two different authentication manners, and the acquiring unit is configured to acquire the authentication success rates respectively corresponding to the at least two different authentication manners from the authentication success rate response message received by the receiving unit.

With reference to the first possible implementation manner of the fifth aspect, in a fourth possible implementation manner of the fifth aspect, the apparatus further includes a storage unit, where the storage unit is configured to store a correspondence between the scenario in which the user equipment is located and the authentication success rates respectively corresponding to the at least two different authentication manners.

With reference to the first possible implementation manner of the fifth aspect, in a fifth possible implementation manner of the fifth aspect, the apparatus further includes a calculation unit, where the calculation unit is configured to calculate a matching degree between the current biometric feature data and the preconfigured biometric feature data corresponding to the target authentication manner, the judging unit is further configured to determine whether the matching degree is greater than or equal to a matching threshold corresponding to the target authentication manner, and the judging unit is configured to: when the matching degree is greater than or equal to the matching threshold, determine that identity authentication succeeds; or the judging unit is configured to: when the matching degree is less than the matching threshold, determine that identity authentication fails.

With reference to the fifth aspect or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, in a sixth possible implementation manner of the fifth aspect, the at least two different authentication manners include any combination of fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to a sixth aspect, the present invention provides user equipment, where the user equipment has at least two different authentication manners; and the user equipment includes a processor, configured to detect a scenario in which the user equipment is located; where the processor is further configured to determine, from the at least two different authentication manners, a target authentication manner corresponding to the scenario in which the user equipment is located, the processor is further configured to acquire current biometric feature data used for the target authentication manner, and the processor is further configured to determine, according to the current biometric feature data, and preconfigured biometric feature data corresponding to the target authentication manner, whether identity authentication succeeds.

With reference to the sixth aspect, in a first possible implementation manner of the sixth aspect, the processor is further configured to acquire authentication success rates respectively corresponding to the at least two different authentication manners in the scenario in which the user equipment is located, and the processor is configured to determine an authentication manner with a highest authentication success rate from the at least two different authentication manners as the target authentication manner according to the authentication success rates respectively corresponding to the at least two different authentication manners.

With reference to the first possible implementation manner of the sixth aspect, in a second possible implementation manner of the sixth aspect, the processor is configured to acquire related parameter information respectively corresponding to the at least two different authentication manners in the scenario in which the user equipment is located, where the related parameter information includes any one or a combination of current location information, current time information, current temperature information, illumination intensity information, or noise intensity information, and the processor is further configured to acquire, according to the related parameter information respectively corresponding to the at least two different authentication manners, the authentication success rates respectively corresponding to the at least two different authentication manners.

With reference to the first possible implementation manner of the sixth aspect, in a third possible implementation manner of the sixth aspect, the processor is further configured to acquire current location information and current time information, and the user equipment further includes a transmitter and a receiver, where the transmitter is configured to send an authentication success rate request message to a server, where the authentication success rate request message carries the current location information and the current time information that are acquired by the processor, and the at least two different authentication manners, the receiver is configured to receive an authentication success rate response message sent by the server, where the authentication success rate response message carries the authentication success rates respectively corresponding to the at least two different authentication manners, and the processor is configured to acquire the authentication success rates respectively corresponding to the at least two different authentication manners from the authentication success rate response message received by the receiver.

With reference to the first possible implementation manner of the sixth aspect, in a fourth possible implementation manner of the sixth aspect, the user equipment further includes a memory, where the memory is configured to store a correspondence between the scenario in which the user equipment is located and the authentication success rates respectively corresponding to the at least two different authentication manners.

With reference to the first possible implementation manner of the sixth aspect, in a fifth possible implementation manner of the sixth aspect, the processor is further configured to calculate a matching degree between the current biometric feature data and the preconfigured biometric feature data corresponding to the target authentication manner, the processor is further configured to determine whether the matching degree is greater than or equal to a matching threshold corresponding to the target authentication manner, and the processor is configured to: when the matching degree is greater than or equal to the matching threshold, determine that identity authentication succeeds; or the processor is specifically configured to: when the matching degree is less than the matching threshold, determine that identity authentication fails.

With reference to the sixth aspect or the first possible implementation manner of the sixth aspect, or the second possible implementation manner of the sixth aspect, or the third possible implementation manner of the sixth aspect, or the fourth possible implementation manner of the sixth aspect, or the fifth possible implementation manner of the sixth aspect, in a sixth possible implementation manner of the sixth aspect, the at least two different authentication manners include any combination of fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to the identity authentication method and apparatus, and the user equipment provided in the present invention, a scenario in which the user equipment is located is first detected; an authentication level corresponding to the scenario in which the user equipment is located is determined from at least two different authentication levels; then current biometric feature data entered by a user is acquired; and finally it is determined, according to the current biometric feature data, preconfigured biometric feature data, and the authentication level, whether identity authentication succeeds. In comparison with a prior-art manner of determining, by using a fixed matching threshold, whether identity authentication succeeds, in the present invention, a trust level of identity authentication by the user equipment in a current status or a current environment can be determined by using a current profile mode of the user equipment, or a location area in which the user equipment is currently located, or a current surrounding environment situation of the user equipment, and a corresponding matching threshold is further determined according to the trust level, so that when the surrounding environment is not favorable for user authentication, and the current environment is relatively safe, the matching threshold for authentication by the user equipment can be reduced, avoiding a case in which identity authentication needs to be repeated multiple times due to impact of a surrounding environment, and improving accuracy of identity authentication.

According to the identity authentication method and apparatus, and the user equipment provided in the present invention, a scenario in which the user equipment is located is first detected; a target authentication manner corresponding to the scenario in which the user equipment is located is determined from at least two different authentication manners; then current biometric feature data used for the target authentication manner is acquired; and finally it is determined, according to the current biometric feature data, and preconfigured biometric feature data corresponding to the target authentication manner, whether identity authentication succeeds. In comparison with a current manner of performing identity authentication only in one authentication manner, in the present invention, an authentication success rate corresponding to each authentication manner in a current scenario can be obtained through calculation by using parameter information related to a current status or a current environment, so that identity authentication can be performed for a user in an authentication manner with a highest authentication success rate in the current scenario, avoiding a case in which identity authentication needs to be repeated multiple times in some authentication manners due to impact of a surrounding environment, and improving accuracy of identity authentication.

BRIEF DESCRIPTION OF THE DRAWINGS

To describe the technical solutions in the present invention or in the prior art more clearly, the following briefly describes the accompanying drawings required for describing the present invention or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
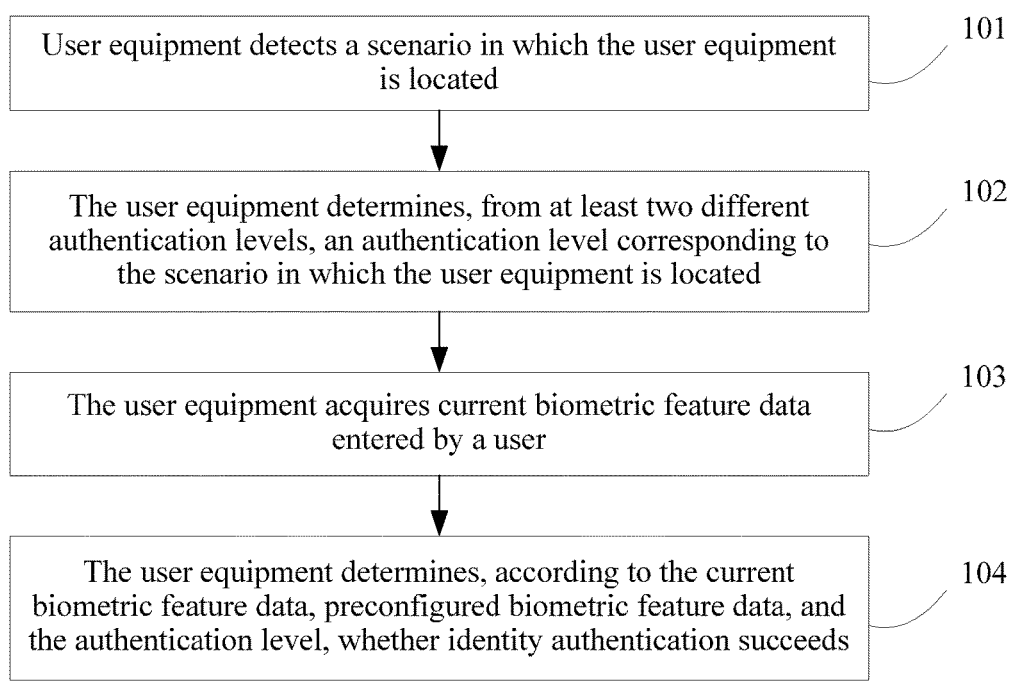
FIG. 1 is a flowchart of an identity authentication method according to an embodiment of the present invention.

An embodiment of the present invention provides an identity authentication method, which is executed by user equipment, where the user equipment has a function of biometric feature-based identity authentication, and identity authentication includes at least two different authentication levels, so that accuracy of identity authentication can be improved. As shown in FIG. 1, the method includes the following steps.

101. The user equipment detects a scenario in which the user equipment is located.

The scenario in which the user equipment is located may include a profile mode, a location, or a surrounding environment of the user equipment.

The manner of performing biometric feature-based identity authentication is fingerprint authentication, palmprint authentication, voiceprint authentication, voice authentication, iris authentication, retina authentication, face authentication, deoxyribonucleic acid (English: Deoxyribo Nucleic Acid, DNA for short) authentication, vein authentication, hand shape authentication, behavior authentication, or heart sound authentication.

In this embodiment of the present invention, user equipment that has various sensors may be used to detect the scenario, or a wearable device that has various sensors may be used to detect the scenario. The various sensors include a motion sensor, a biometric sensor, an environment sensor, and the like, where the motion sensor further includes a pressure sensor, a speed sensor, an acceleration sensor, a gyroscope, or the like; the biometric sensor further includes an electrocardiograph sensor, a vein sensor, a body temperature sensor, or the like; and the environment sensor further includes a temperature sensor, a humidity sensor, a barometric pressure sensor, a rain sensor, an illumination sensor, a wind speed and direction sensor, or the like. In this embodiment of the present invention, the wearable device may be a smart band, a smart ring, smart glasses, or the like.

102. The user equipment determines, from the at least two different authentication levels, an authentication level corresponding to the scenario in which the user equipment is located.

In this embodiment of the present invention, different scenarios are corresponding to different authentication levels, and a higher authentication level represents a higher trust degree of authentication performed by the user equipment in the scenario.

103. The user equipment acquires current biometric feature data entered by a user.

104. The user equipment determines, according to the current biometric feature data, preconfigured biometric feature data, and the authentication level, whether identity authentication succeeds.

Specifically, when the user equipment performs identity authentication, the user equipment acquires a matching degree between the current biometric feature data and the preconfigured biometric feature data, and if the matching degree is greater than or equal to a matching threshold, the user equipment determines that identity authentication succeeds; or if the matching degree is less than a matching threshold, the user equipment determines that identity authentication fails.

In this embodiment of the present invention, it is determined, by using a matching threshold that is corresponding to a trust level corresponding to a current status or a current environment of the user equipment, whether identity authentication succeeds, which can improve accuracy of identity authentication by the user equipment. For example, if an initial matching threshold is 90%, and the user performs identity authentication by using the user equipment held by the user, when identity authentication is performed in a face authentication manner, and an environment in which the user equipment is currently located is relatively dark, the matching degree that is between the current biometric feature data and the preconfigured biometric feature data and is acquired by the user equipment is 82% due to impact of the current environment, and the user equipment determines, in a current existing authentication manner, that identity authentication fails. In this case, the user needs to repeat identity authentication multiple times. However, in the authentication manner provided in this embodiment of the present invention, a current trust level acquired by the user equipment is a level 4, and a corresponding matching threshold is 80%; further, the user equipment determines that identity authentication succeeds.

According to the identity authentication method provided in this embodiment of the present invention, a scenario in which user equipment is located is first detected; an authentication level corresponding to the scenario in which the user equipment is located is determined from at least two different authentication levels; then current biometric feature data entered by a user is acquired; and finally it is determined, according to the current biometric feature data, preconfigured biometric feature data, and the authentication level, whether identity authentication succeeds. In comparison with a prior-art manner of determining, by using a fixed matching threshold, whether identity authentication succeeds, in this embodiment of the present invention, a trust level of identity authentication by the user equipment in a current status or a current environment can be determined by using a current profile mode of the user equipment, or a location area in which the user equipment is currently located, or a current surrounding environment situation of the user equipment, and a corresponding matching threshold is further determined according to the trust level, so that when the surrounding environment is not favorable for user authentication, and the current environment is relatively safe, the matching threshold for authentication by the user equipment can be reduced, avoiding a case in which identity authentication needs to be repeated multiple times due to impact of a surrounding environment, and improving accuracy of identity authentication.

Figure 2:
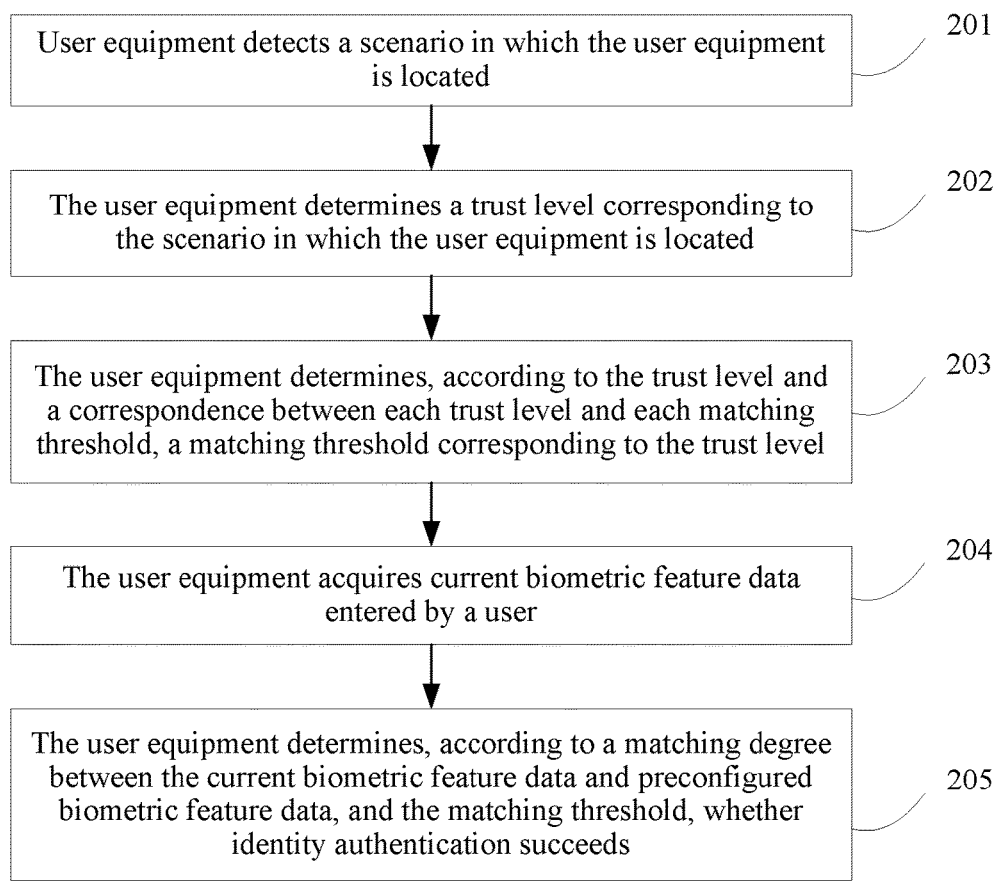
FIG. 2 is a flowchart of another identity authentication method according to an embodiment of the present invention.

As a specific description of the method shown in FIG. 1, an embodiment of the present invention provides another identity authentication method. As shown in FIG. 2, the method includes the following steps.

201. User equipment detects a scenario in which the user equipment is located.

The scenario in which the user equipment is located may include a profile mode, a location, or a surrounding environment of the user equipment.

In this embodiment of the present invention, the foregoing manner of performing biometric feature-based identity authentication may be fingerprint authentication, palmprint authentication, voiceprint authentication, voice authentication, iris authentication, retina authentication, face authentication, DNA authentication, vein authentication, hand shape authentication, behavior authentication, heart sound authentication, or the like.

In this embodiment of the present invention, user equipment that has various sensors may be used to detect the scenario, or a wearable device that has various sensors may be used to detect the scenario. The various sensors include a motion sensor, a biometric sensor, an environment sensor, and the like, where the motion sensor further includes a pressure sensor, a speed sensor, an acceleration sensor, a gyroscope, or the like; the biometric sensor further includes an electrocardiograph sensor, a vein sensor, a body temperature sensor, or the like; and the environment sensor further includes a temperature sensor, a humidity sensor, a barometric pressure sensor, a rain sensor, an illumination sensor, a wind speed and direction sensor, or the like. In this embodiment of the present invention, the wearable device may be a smart band, a smart ring, smart glasses, or the like.

202. The user equipment determines a trust level corresponding to the scenario in which the user equipment is located.

Optionally, when the scenario in which the user equipment is located is the profile mode of the user equipment, the user equipment may preconfigure a correspondence between each profile mode and each trust level. In this case, before step 202, the method may further include: acquiring, by the user equipment, a current profile mode of the user equipment. In this case, step 202 may be specifically: the user equipment determines the corresponding trust level according to the current profile mode of the user equipment and the correspondence between each profile mode and each trust level.

In this embodiment of the present invention, when a user sets the profile mode of the user equipment according to a user requirement, the user equipment can directly acquire the profile mode set by the user; when a user does not set the profile mode of the user equipment, the user equipment may analyze a user requirement according to parameters such as a current date, current time, and a location, and configure and acquire the corresponding profile mode.

Specifically, the acquiring, by the user equipment, a current profile mode of the user equipment may be specifically: the user equipment first acquires profile mode-related parameter information, where the profile mode-related parameter information includes any one or a combination of current location information, current time information, current temperature information, illumination intensity information, or noise intensity information, and then acquires the current profile mode of the user equipment according to the profile mode-related parameter information.

In this embodiment of the present invention, profile modes of the user equipment include a driving mode, a family mode, a meeting mode, an outdoor mode, and the like, and the different profile modes are corresponding to different trust levels. In this embodiment of the present invention, the user may set the correspondence between each profile mode and each trust level according to a user requirement, or the user equipment may preconfigure the correspondence between each profile mode and each trust level, which is not limited in this embodiment of the present invention.

For example, a trust level corresponding to the "driving mode" may be a level 4, a trust level corresponding to the "family mode" may be a level 3, a trust level corresponding to the "meeting mode" may be a level 2, and a trust level corresponding to the "outdoor mode" may be a level 1, where the level 1 is a trust level with a lowest trust degree.

Optionally, when the scenario in which the user equipment is located is the location of the user equipment, the user equipment may preconfigure a correspondence between each location area and each trust level. In this case, before step 202, the method may further include: acquiring, by the user equipment, a location area in which the user equipment is currently located. In this case, step 202 may be specifically: the user equipment determines the corresponding trust level according to the location area in which the user equipment is currently located and the correspondence between each location area and each trust level.

In this embodiment of the present invention, before the user equipment configures the correspondence between each location area and each trust level, the method may further include: dividing, by the user equipment, each location area. Specifically, the user equipment may divide each location area according to geographical location information, or may divide each location area according to a corresponding base station identifier, or may divide each location area according to an identifier of an accessed Wireless Fidelity (English: Wireless Fidelity, WIFI for short) network, or may divide each location area according to an identifier of a paired Bluetooth device, or may divide each location area according to a charging type.

In this embodiment of the present invention, when the user equipment is located in different location areas, the different location areas are corresponding to different trust levels. In this embodiment of the present invention, the location of the user equipment may be an actual geographical location, or may be an abstract concept, which is not limited in this embodiment of the present invention.

For example, when the actual geographical location is used to represent the location of the user equipment, a highest trust level may be configured for a location in which the user lives, a higher trust level may be configured for a location in which the user works, a lower trust level may be configured for another place (exemplarily, a restaurant, a gym, or the like) frequented by the user, and a lowest trust level may be configured for another location.

For another example, when the abstract concept is used to represent the location of the user equipment, different trust levels may be respectively configured according to identifiers of different base stations accessed by the user equipment; different trust levels may be respectively configured according to identifiers of different WIFI networks accessed by the user equipment; different trust levels may be respectively configured according to identifiers of Bluetooth devices with which the user equipment is being paired; or different trust levels may be configured according to whether the user equipment is being charged.

In this embodiment of the present invention, when the different trust levels are respectively configured according to the identifiers of the different base stations accessed by the user equipment, it is assumed that the different base stations that can be accessed by the user equipment include a base station 1, a base station 2, a base station 3, and a base station 4, where the base station 1 is a base station that covers the user's residential location, and a highest trust level may be configured for the base station 1; the base station 2 is a base station that covers the user's working location, and a higher trust level may be configured for the base station 2; the base station 3 is a base station that covers the user's recreational location, and a lower trust level may be configured for the base station 3; and the base station 4 is a base station that covers another location, and a lowest trust level may be configured for the base station 4

In this embodiment of the present invention, when the different trust levels are respectively configured according to the identifiers of the different WIFI networks accessed by the user equipment, it is assumed that the different WIFI networks that can be accessed by the user equipment include a WIFI network 1, a WIFI network 2, a WIFI network 3, and a WIFI network 4, where the WIFI network 1 is a WIFI network of the user's residential location, and a highest trust level may be configured for the WIFI network 1; the WIFI network 2 is a WIFI network of the user's working location, and a higher trust level may be configured for the WIFI network 2; the WIFI network 3 is a WIFI network of for the user's recreational place, and a lower trust level may be configured for the WIFI network 3; and the WIFI network 4 is a WIFI network of another location, and a lowest trust level may be configured for the WIFI network 4.

In this embodiment of the present invention, when the different trust levels are respectively configured according to the identifiers of the Bluetooth devices with which the user equipment is being paired, it is assumed that Bluetooth devices with which the user equipment has been paired include a device 1, a device 2, a device 3, and a device 4, where the device 1 is another device held by the user, and a highest trust level may be configured for the device 1; the device 2 is a device held by a family or a good friend of the user, and a higher trust level may be configured for the device 2; the device 3 is a device held by a colleague or a common friend of the user, a lower trust level may be configured for the device 3; and the device 4 is another device, and a lowest trust level may be configured for the device 4.

In this embodiment of the present invention, when the different trust levels are respectively configured according to whether the user equipment is being charged, if the user equipment is being charged by using a fixed power supply, a highest trust level is configured for the user equipment; if the user equipment is being charged by using a mobile power supply, a higher trust level is configured for the user equipment; and if the user equipment is not being charged, a lower trust level is configured for the user equipment.

Optionally, when the scenario in which the user equipment is located is the surrounding environment of the user equipment, the user equipment may preconfigure a correspondence between each environment impact factor and each trust level, where the environment impact factor is used to represent a degree to which identity authentication performed by the user equipment is affected by the surrounding environment, and a larger value of the environment impact factor is corresponding to a higher trust level. In this case, before step 202, the method may further include: acquiring, by the user equipment, a current environment impact factor of the user equipment. In this case, step 202 may be specifically: the user equipment determines the corresponding trust level according to the current environment impact factor of the user equipment and the correspondence between each environment impact factor and each trust level.

In this embodiment of the present invention, the acquiring, by the user equipment, a current environment impact factor of the user equipment may be specifically: the user equipment first acquires environment impact factor-related parameter information, where the environment impact factor-related parameter information includes any one or a combination of current location information, current time information, current temperature information, illumination intensity information, or noise intensity information; and then acquires the current environment impact factor of the user equipment according to the environment impact factor-related parameter information.

In this embodiment of the present invention, when the user equipment is located in different surrounding environments, the different surrounding environments are corresponding to different trust levels. In this embodiment of the present invention, the different surrounding environments may be determined according to parameters such as illumination intensity, environment noise, temperature, and humidity.

For example, if the user equipment is located in a same location during the day and at night, and illumination intensity is different, it is considered that surrounding environments are different, and different trust levels are configured for the surrounding environments.

203. The user equipment determines, according to the trust level and a correspondence between each trust level and each matching threshold, a matching threshold corresponding to the trust level.

In this embodiment of the present invention, an authentication level may be a matching threshold.

Optionally, before step 203, the method may further include: configuring, by the user equipment, the correspondence between each trust level and each matching threshold, where the trust level is used to represent a degree to which the user is trusted in a current scenario, and the matching threshold is used to determine whether identity authentication succeeds; and a higher trust level is corresponding to a lower matching threshold.

In this embodiment of the present invention, different trust levels are respectively corresponding to different matching thresholds. In this embodiment of the present invention, if a trust level is higher, that is, the degree to which the user is trusted in the current scenario is higher, a corresponding matching threshold is lower.

For example, a trust level is a level 4, and a corresponding matching threshold may be 60%; a trust level is a level 3, and a corresponding matching threshold may be 70%; a trust level is a level 2, and a corresponding matching threshold may be 80%; and a trust level is a level 1, and a corresponding matching threshold may be 90%.

In this embodiment of the present invention, the user equipment may preconfigure a corresponding lowest matching threshold for each authentication manner, and a matching threshold corresponding to any trust level cannot be lower than the lowest matching threshold. In this embodiment of the present invention, the corresponding lowest matching threshold is configured for each authentication manner, which can avoid a case in which another user can also be successfully authenticated due to an excessively low matching threshold, that is, can ensure security of identity authentication by the user equipment.

In this embodiment of the present invention, the user equipment may configure the correspondence between each trust level and each matching threshold according to a user requirement, or the user equipment may preconfigure the correspondence between each trust level and each matching threshold.

It should be noted that this embodiment of the present invention is not limited to adjusting a matching threshold of one authentication manner, and adjusting matching thresholds of any quantity of authentication manners is also applicable to this embodiment of the present invention. For example, weighted matching thresholds of two authentication manners supported by the user equipment are adjusted.

204. The user equipment acquires current biometric feature data entered by a user.

205. The user equipment determines, according to a matching degree between the current biometric feature data and preconfigured biometric feature data, and the matching threshold, whether identity authentication succeeds.

Optionally, step 205 may be: if the matching degree is greater than or equal to the matching threshold, the user equipment determines that identity authentication succeeds; or if the matching degree is less than the matching threshold, the user equipment determines that identity authentication fails.

In this embodiment of the present invention, it is determined, by using a matching threshold that is corresponding to a trust level corresponding to a current status or a current environment of the user equipment, whether identity authentication succeeds, which can improve accuracy of identity authentication by the user equipment. For example, if an initial matching threshold is 90%, and the user performs identity authentication by using the user equipment held by the user, when identity authentication is performed in a face authentication manner, and an environment in which the user equipment is currently located is relatively dark, the matching degree that is between the current biometric feature data and the preconfigured biometric feature data and is acquired by the user equipment is 82% due to impact of the current environment, and the user equipment determines, in a current existing authentication manner, that identity authentication fails. In this case, the user needs to repeat identity authentication multiple times. However, in the authentication manner provided in this embodiment of the present invention, a current trust level acquired by the user equipment is a level 4, and a corresponding matching threshold is 80%; further, the user equipment determines that identity authentication succeeds.

Optionally, step 205 may further be: when the matching degree is greater than or equal to the matching threshold, the user equipment acquires an operation type corresponding to a current biometric feature, and determines whether the operation type is the same as a preconfigured operation type. Further, if the operation type is the same as the preconfigured operation type, the user equipment determines that identity authentication succeeds; or if the operation type is different from the preconfigured operation type, the user equipment determines that identity authentication fails.

Different preconfigured operation types may be configured for different identity authentication manners. Exemplarily, when the user equipment performs voiceprint authentication, the preconfigured operation type may be a preconfigured password, for example, "Today is the eighth day of a week"; when the user equipment performs behavior authentication, the preconfigured operation type may be a preconfigured behavior, for example, the user raises a hand; when the user equipment performs fingerprint authentication, the preconfigured operation type may be preconfigured pressing pressure.

In this embodiment of the present invention, after the matching threshold for performing identity authentication by the user is reduced, the user equipment performs further authentication, that is, determining whether the operation type is the same as the preconfigured operation type, which can avoid a case in which another user can also be authenticated successfully after the matching threshold is reduced, that is, can ensure security of identity authentication by the user equipment.

In this embodiment of the present invention, before the matching threshold is adjusted according to the scenario in which the user equipment is located, a matching threshold for performing identity authentication by the user equipment is an initial matching threshold; and after being adjusted, a matching threshold for performing identity authentication by the user equipment is a current matching threshold. In this embodiment of the present invention, when the matching degree is greater than or equal to the initial matching threshold, the user equipment does not need to perform the foregoing step of acquiring and determining the operation type, and it may be considered that identity authentication succeeds; or when the matching degree is greater than or equal to the current matching threshold and is less than the initial matching threshold, the user equipment may perform the foregoing step of acquiring and determining the operation type, so as to ensure security of identity authentication.

According to the identity authentication method provided in this embodiment of the present invention, a scenario in which user equipment is located is first detected; an authentication level corresponding to the scenario in which the user equipment is located is determined from at least two different authentication levels; then current biometric feature data entered by a user is acquired; and finally it is determined, according to the current biometric feature data, preconfigured biometric feature data, and the authentication level, whether identity authentication succeeds. In comparison with a prior-art manner of determining, by using a fixed matching threshold, whether identity authentication succeeds, in this embodiment of the present invention, a trust level of identity authentication by the user equipment in a current status or a current environment can be determined by using a current profile mode of the user equipment, or a location area in which the user equipment is currently located, or a current surrounding environment situation of the user equipment, and a corresponding matching threshold is further determined according to the trust level, so that when the surrounding environment is not favorable for user authentication, and the current environment is relatively safe, the matching threshold for authentication by the user equipment can be reduced, avoiding a case in which identity authentication needs to be repeated multiple times due to impact of a surrounding environment, and improving accuracy of identity authentication.

Figure 3:
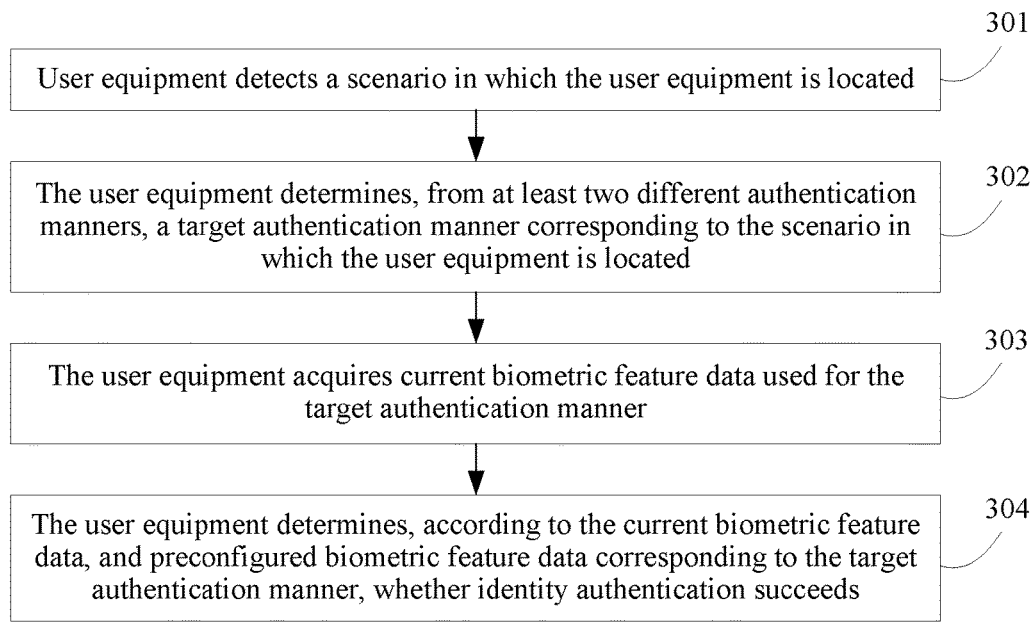
FIG. 3 is a flowchart of another identity authentication method according to an embodiment of the present invention.

An embodiment of the present invention provides another identity authentication method, which is executed by user equipment, where the user equipment has at least two different authentication manners, so that accuracy of identity authentication can be improved. As shown in FIG. 3, the method includes the following steps.

301. The user equipment detects a scenario in which the user equipment is located.

The scenario in which the user equipment is located may include a profile mode, a location, or a surrounding environment of the user equipment.

In this embodiment of the present invention, the foregoing at least two different authentication manners include any combination of fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

In this embodiment of the present invention, user equipment that has various sensors may be used to detect the scenario, or a wearable device that has various sensors may be used to detect the scenario. The various sensors include a motion sensor, a biometric sensor, an environment sensor, and the like, where the motion sensor further includes a pressure sensor, a speed sensor, an acceleration sensor, a gyroscope, or the like; the biometric sensor further includes an electrocardiograph sensor, a vein sensor, a body temperature sensor, or the like; and the environment sensor further includes a temperature sensor, a humidity sensor, a barometric pressure sensor, a rain sensor, an illumination sensor, a wind speed and direction sensor, or the like. In this embodiment of the present invention, the wearable device may be a smart band, a smart ring, smart glasses, or the like.

302. The user equipment determines, from the at least two different authentication manners, a target authentication manner corresponding to the scenario in which the user equipment is located.

The target authentication manner is an optimal authentication manner for the user equipment in the scenario in which the user equipment is located.

In this embodiment of the present invention, the user equipment may determine the target authentication manner according to authentication success rates respectively corresponding to the at least two different authentication manners in the scenario in which the user equipment is located.

303. The user equipment acquires current biometric feature data used for the target authentication manner.

304. The user equipment determines, according to the current biometric feature data, and preconfigured biometric feature data corresponding to the target authentication manner, whether identity authentication succeeds.

Specifically, when the user equipment performs identity authentication, the user equipment acquires a matching degree between the current biometric feature data and the preconfigured biometric feature data, and if the matching degree is greater than or equal to a matching threshold, the user equipment determines that identity authentication succeeds; or if the matching degree is less than a matching threshold, the user equipment determines that identity authentication fails.

According to the identity authentication method provided in this embodiment of the present invention, a scenario in which user equipment is located is first detected; a target authentication manner corresponding to the scenario in which the user equipment is located is determined from at least two different authentication manners; then current biometric feature data used for the target authentication manner is acquired; and finally it is determined, according to the current biometric feature data, and preconfigured biometric feature data corresponding to the target authentication manner, whether identity authentication succeeds. In comparison with a current manner of performing identity authentication only in one authentication manner, in this embodiment of the present invention, an authentication success rate corresponding to each authentication manner in a current scenario can be obtained through calculation by using parameter information related to a current status or a current environment, so that identity authentication can be performed for a user in an authentication manner with a highest authentication success rate in the current scenario, avoiding a case in which identity authentication needs to be repeated multiple times in some authentication manners due to impact of a surrounding environment, and improving accuracy of identity authentication.

Figure 4:
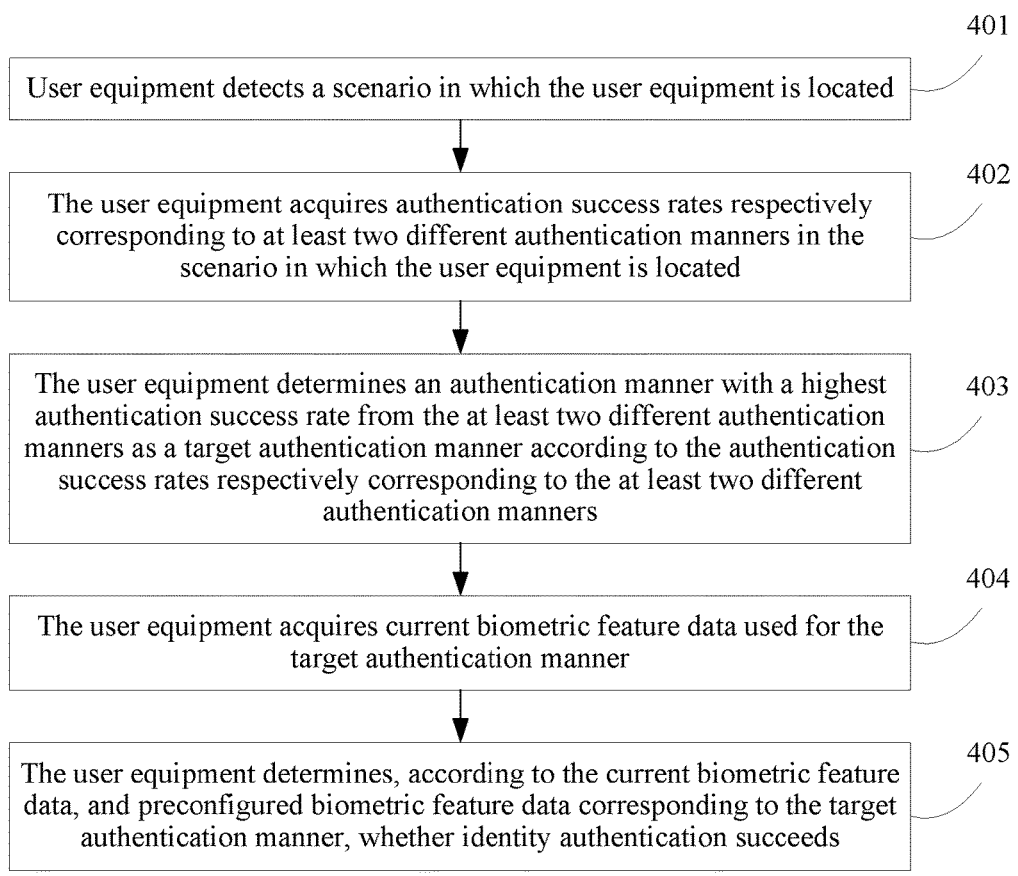
FIG. 4 is a flowchart of another identity authentication method according to an embodiment of the present invention.

As a specific description of the method shown in FIG. 3, an embodiment of the present invention provides another identity authentication method. As shown in FIG. 4, the method includes the following steps.

401. User equipment detects a scenario in which the user equipment is located.

The scenario in which the user equipment is located may include a profile mode, a location, or a surrounding environment of the user equipment.

In this embodiment of the present invention, the foregoing at least two different authentication manners include any combination of fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

In this embodiment of the present invention, user equipment that has various sensors may be used to detect the scenario, or a wearable device that has various sensors may be used to detect the scenario. The various sensors include a motion sensor, a biometric sensor, an environment sensor, and the like, where the motion sensor further includes a pressure sensor, a speed sensor, an acceleration sensor, a gyroscope, or the like; the biometric sensor further includes an electrocardiograph sensor, a vein sensor, a body temperature sensor, or the like; and the environment sensor further includes a temperature sensor, a humidity sensor, a barometric pressure sensor, a rain sensor, an illumination sensor, a wind speed and direction sensor, or the like. In this embodiment of the present invention, the wearable device may be a smart band, a smart ring, smart glasses, or the like.

402. The user equipment acquires authentication success rates respectively corresponding to at least two different authentication manners in the scenario in which the user equipment is located.

Optionally, before step 402, the method may further include: first acquiring, by the user equipment, current location information and current time information; then sending an authentication success rate request message to a server, where the authentication success rate request message carries the current location information, the current time information, and the at least two different authentication manners; and finally receiving an authentication success rate response message sent by the server, where the authentication success rate response message carries the authentication success rates respectively corresponding to the at least two different authentication manners. In this case, step 402 may be specifically: the user equipment acquires the authentication success rates respectively corresponding to the at least two different authentication manners from the authentication success rate response message.

Optionally, after step 402, the method may further include: storing, by the user equipment, a correspondence between the scenario in which the user equipment is located and the authentication success rates respectively corresponding to the at least two different authentication manners.

In this embodiment of the present invention, the user equipment stores the correspondence between the scenario in which the user equipment is located and the authentication success rates respectively corresponding to the at least two different authentication manners, so that the prestored correspondence between the scenario in which the user equipment is located and the authentication success rates respectively corresponding to the at least two different authentication manners can be directly acquired when a user is in the scenario again, and the authentication success rates respectively corresponding to the at least two different authentication manners are acquired according to the correspondence, thereby reducing complexity of acquiring the authentication success rates.

403. The user equipment determines an authentication manner with a highest authentication success rate from the at least two different authentication manners as a target authentication manner according to the authentication success rates respectively corresponding to the at least two different authentication manners.

Optionally, step 403 may be specifically: the user equipment first acquires related parameter information respectively corresponding to the at least two different authentication manners in the scenario in which the user equipment is located, where the related parameter information includes any one or a combination of current location information, current time information, current temperature information, illumination intensity information, or noise intensity information; and then acquires, according to the related parameter information respectively corresponding to the at least two different authentication manners, the authentication success rates respectively corresponding to the at least two different authentication manners.

It should be noted that the target authentication manner may be one authentication manner, or may be multiple authentication manners. This embodiment of the present invention is described by using a case in which the target authentication manner is one authentication manner, but this embodiment of the present invention is not limited to the case in which the target authentication manner is one authentication manner, and a case in which the target authentication manner is any other quantity of authentication manners is applicable to this embodiment of the present invention.

404. The user equipment acquires current biometric feature data used for the target authentication manner.

405. The user equipment determines, according to the current biometric feature data, and preconfigured biometric feature data corresponding to the target authentication manner, whether identity authentication succeeds.

Optionally, step 405 may be specifically: the user equipment first calculates a matching degree between the current biometric feature data and the preconfigured biometric feature data corresponding to the target authentication manner, and then determines whether the matching degree is greater than or equal to a matching threshold corresponding to the target authentication manner, where if the matching degree is greater than or equal to the matching threshold, the user equipment determines that identity authentication succeeds; or if the matching degree is less than the matching threshold, the user equipment determines that identity authentication fails.

In this embodiment of the present invention, the user equipment may further provide respective corresponding authentication manners for different shortcut functions. Specifically, when the user equipment is in a locked state, a user lights up a device screen, and when the user's finger slides down from a central icon location to a camera icon location, the user equipment enters a photographing mode; when the user's finger slides up from the central icon location to an SMS icon location, the user equipment enters an SMS editing interface; when the user's finger slides left from the central icon location to a phone icon location, the user equipment enters a phone call interface; and when the user's finger slides right from the central icon location to a browser icon location, the user equipment enters a search interface. In this case, the user equipment detects an operation intention of the user, and when entering a specific function in a shortcut manner, the user equipment activates an authentication manner corresponding to the specific function to prompt the user to perform identity authentication. For example, it is preset that a shortcut manner of enabling a camera function is bound with face authentication, a shortcut manner of enabling an SMS function is bound with voice authentication, a shortcut manner of enabling a phone function is bound with voiceprint authentication, and a shortcut manner of enabling a browser function is bound with fingerprint authentication.

In this embodiment of the present invention, the respective corresponding authentication manners are provided for the different shortcut functions, and that different shortcut manners are corresponding to different biometric feature authentication manners can be preset, avoiding a tedious case in which the user needs to perform identity authentication again after the user uses the specific function in a shortcut manner, and improving the identity authentication.

In this embodiment of the present invention, the user equipment may provide a same authentication manner for the different shortcut manners, but the different shortcut manners are corresponding to different matching thresholds. For example, it is preset that a shortcut manner is bound with fingerprint authentication, and when the shortcut manner of the camera function is enabled, a matching threshold of fingerprint authentication is 50%; when the shortcut manner of the SMS function is enabled, a matching threshold of fingerprint authentication is 60%; when the shortcut manner of the phone function is enabled, a matching threshold of fingerprint authentication is 70%; and when the shortcut manner of the browser function is enabled, a matching threshold of fingerprint authentication is 80%.

According to the identity authentication method provided in this embodiment of the present invention, a scenario in which user equipment is located is first detected; a target authentication manner corresponding to the scenario in which the user equipment is located is determined from at least two different authentication manners; then current biometric feature data used for the target authentication manner is acquired; and finally it is determined, according to the current biometric feature data, and preconfigured biometric feature data corresponding to the target authentication manner, whether identity authentication succeeds. In comparison with a current manner of performing identity authentication only in one authentication manner, in this embodiment of the present invention, an authentication success rate corresponding to each authentication manner in a current scenario can be obtained through calculation by using parameter information related to a current status or a current environment, so that identity authentication can be performed for a user in an authentication manner with a highest authentication success rate in the current scenario, avoiding a case in which identity authentication needs to be repeated multiple times in some authentication manners due to impact of a surrounding environment, and improving accuracy of identity authentication.

Figure 5:
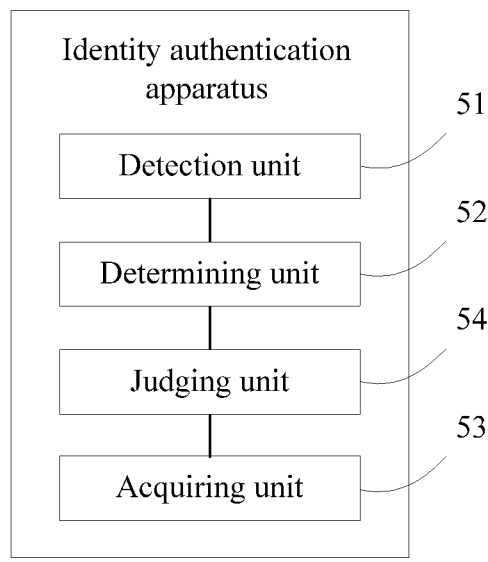
FIG. 5 is a schematic structural diagram of an identity authentication apparatus according to an embodiment of the present invention.

Further, in implementation of the methods shown in FIG. 1 and FIG. 2, an embodiment of the present invention further provides an identity authentication apparatus, where the apparatus may be located in user equipment, the user equipment has a function of biometric feature-based identity authentication, identity authentication includes at least two different authentication levels to improve accuracy of identity authentication, and the apparatus is configured to improve accuracy of identity authentication. As shown in FIG. 5, the apparatus includes a detection unit 51, a determining unit 52, an acquiring unit 53, and a judging unit 54.

The detection unit 51 is configured to detect a scenario in which the user equipment is located.

The determining unit 52 is configured to determine, from the at least two different authentication levels, an authentication level corresponding to the scenario in which the user equipment is located and that is detected by the detection unit 51.

The acquiring unit 53 is configured to acquire current biometric feature data entered by a user.

The judging unit 54 is configured to determine, according to the current biometric feature data acquired by the acquiring unit 53, preconfigured biometric feature data, and the authentication level determined by the determining unit 52, whether identity authentication succeeds.

The scenario in which the user equipment is located and that is detected by the detection unit 51 includes a profile mode, a location, or a surrounding environment of the user equipment.

The authentication level determined by the determining unit 52 is a matching threshold.

The determining unit 52 is specifically configured to determine a trust level corresponding to the scenario in which the user equipment is located.

The determining unit 52 is further specifically configured to determine, according to the trust level and a correspondence between each trust level and each matching threshold, a matching threshold corresponding to the trust level.

The judging unit 54 is specifically configured to determine, according to a matching degree between the current biometric feature data and the preconfigured biometric feature data, and the matching threshold, whether identity authentication succeeds.

Figure 6:
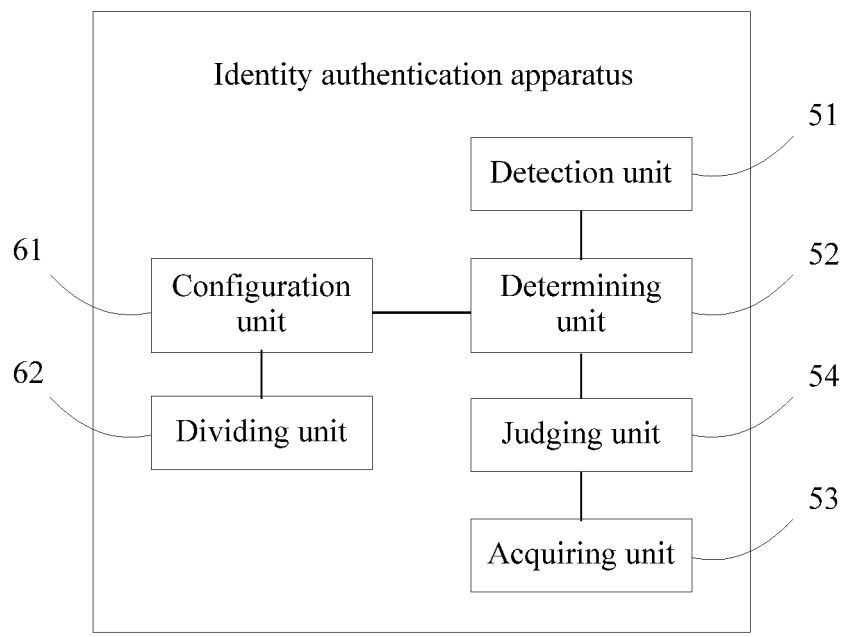
FIG. 6 is a schematic structural diagram of another identity authentication apparatus according to an embodiment of the present invention.

Further, as shown in FIG. 6, the apparatus further includes a configuration unit 61.

The configuration unit 61 is configured to configure the correspondence between each trust level and each matching threshold.

The trust level is used to represent a degree to which the user is trusted in a current scenario, and the matching threshold is used to determine whether identity authentication succeeds; and a higher trust level is corresponding to a lower matching threshold.

The configuration unit 61 is further configured to configure a correspondence between each profile mode and each trust level.

The acquiring unit 53 is further configured to acquire a current profile mode of the user equipment.

The determining unit 52 is specifically configured to determine the corresponding trust level according to the current profile mode of the user equipment and the correspondence between each profile mode and each trust level.

The acquiring unit 53 is specifically configured to acquire profile mode-related parameter information.

The profile mode-related parameter information includes any one or a combination of current location information, current time information, current temperature information, illumination intensity information, or noise intensity information.

The acquiring unit 53 is further specifically configured to acquire the current profile mode of the user equipment according to the profile mode-related parameter information.

The configuration unit 61 is further configured to configure a correspondence between each location area and each trust level.

The acquiring unit 53 is further configured to acquire a location area in which the user equipment is currently located.

The determining unit 52 is specifically configured to determine the corresponding trust level according to the location area in which the user equipment is currently located and the correspondence between each location area and each trust level.

Optionally, the apparatus further includes a dividing unit 62.

The dividing unit 62 is configured to divide each location area.

The dividing unit 62 is specifically configured to divide each location area according to geographical location information, or the dividing unit 62 is specifically configured to divide each location area according to a corresponding base station identifier, or the dividing unit 62 is specifically configured to divide each location area according to an identifier of an accessed Wireless Fidelity WIFI network, or the dividing unit 62 is specifically configured to divide each location area according to an identifier of a paired Bluetooth device, or the dividing unit 62 is specifically configured to divide each location area according to a charging type.

The configuration unit 61 is further configured to configure a correspondence between each environment impact factor and each trust level.

The environment impact factor is used to represent a degree to which identity authentication performed by the user equipment is affected by the surrounding environment, and a larger value of the environment impact factor is corresponding to a higher trust level.

The acquiring unit 53 is further configured to acquire a current environment impact factor of the user equipment.

The determining unit 52 is specifically configured to determine the corresponding trust level according to the current environment impact factor of the user equipment and the correspondence between each environment impact factor and each trust level.

The acquiring unit 53 is specifically configured to acquire environment impact factor-related parameter information.

The environment impact factor-related parameter information includes any one or a combination of current location information, current time information, current temperature information, illumination intensity information, or noise intensity information.

The acquiring unit 53 is further specifically configured to acquire the current environment impact factor of the user equipment according to the environment impact factor-related parameter information.

The judging unit 54 is specifically configured to: when the matching degree is greater than or equal to the matching threshold, determine that identity authentication succeeds; or the judging unit 54 is specifically configured to: when the matching degree is less than the matching threshold, determine that identity authentication fails.

The acquiring unit 53 is further configured to: when the matching degree is greater than or equal to the matching threshold, acquire an operation type corresponding to a current biometric feature.

The judging unit 54 is further configured to determine whether the operation type is the same as a preconfigured operation type.

The judging unit 54 is specifically configured to: when the operation type is the same as the preconfigured operation type, determine that identity authentication succeeds; or the judging unit 54 is specifically configured to: when the operation type is different from the preconfigured operation type, determine that identity authentication fails.

In this embodiment of the present invention, a manner of the biometric feature-based identity authentication is fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to the identity authentication apparatus provided in this embodiment of the present invention, a scenario in which user equipment is located is first detected; an authentication level corresponding to the scenario in which the user equipment is located is determined from at least two different authentication levels; then current biometric feature data entered by a user is acquired; and finally it is determined, according to the current biometric feature data, preconfigured biometric feature data, and the authentication level, whether identity authentication succeeds. In comparison with a prior-art manner of determining, by using a fixed matching threshold, whether identity authentication succeeds, in this embodiment of the present invention, a trust level of identity authentication by the user equipment in a current status or a current environment can be determined by using a current profile mode of the user equipment, or a location area in which the user equipment is currently located, or a current surrounding environment situation of the user equipment, and a corresponding matching threshold is further determined according to the trust level, so that when the surrounding environment is not favorable for user authentication, and the current environment is relatively safe, the matching threshold for authentication by the user equipment can be reduced, avoiding a case in which identity authentication needs to be repeated multiple times due to impact of a surrounding environment, and improving accuracy of identity authentication.

It should be noted that for other corresponding descriptions of units in the identity authentication provided in this embodiment of the present invention, refer to the corresponding descriptions in FIG. 1 and FIG. 2. Details are not repeated herein.

Figure 7:
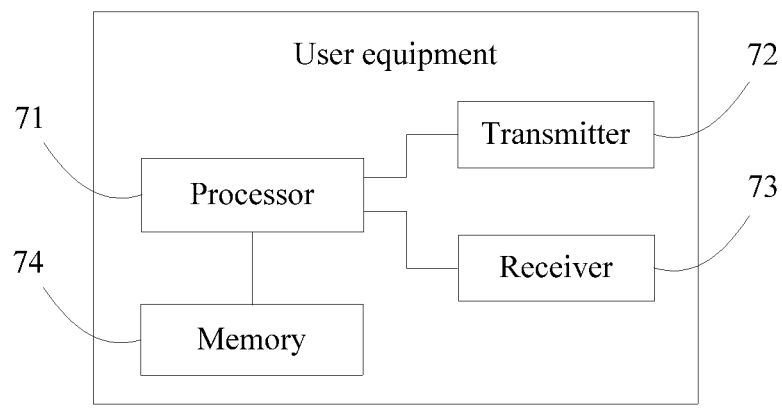
FIG. 7 is a schematic structural diagram of user equipment according to an embodiment of the present invention.

Still further, an embodiment of the present invention further provides user equipment, where the user equipment has a function of biometric feature-based identity authentication, and the identity authentication includes at least two different authentication levels. As shown in FIG. 7, the user equipment includes a processor 71, a transmitter 72, a receiver 73, and a memory 74, and the transmitter 72, the receiver 73, and the memory 74 are separately connected to the processor 71.

The processor 71 is configured to detect a scenario in which the user equipment is located.

The processor 71 is further configured to determine, from the at least two different authentication levels, an authentication level corresponding to the scenario in which the user equipment is located.

The processor 71 is further configured to acquire current biometric feature data entered by a user.

The processor 71 is further configured to determine, according to the current biometric feature data, preconfigured biometric feature data, and the authentication level, whether identity authentication succeeds.

The scenario in which the user equipment is located and that is detected by the processor 71 includes a profile mode, a location, or a surrounding environment of the user equipment.

The authentication level determined by the processor 71 is a matching threshold.

The processor 71 is specifically configured to determine a trust level corresponding to the scenario in which the user equipment is located.

The processor 71 is further specifically configured to determine, according to the trust level and a correspondence between each trust level and each matching threshold, a matching threshold corresponding to the trust level.

The processor 71 is specifically configured to determine, according to a matching degree between the current biometric feature data and the preconfigured biometric feature data, and the matching threshold, whether identity authentication succeeds.

The processor 71 is further configured to configure the correspondence between each trust level and each matching threshold.

The trust level is used to represent a degree to which the user is trusted in a current scenario, and the matching threshold is used to determine whether identity authentication succeeds; and a higher trust level is corresponding to a lower matching threshold.

The processor 71 is further configured to configure a correspondence between each profile mode and each trust level.

The processor 71 is further configured to acquire a current profile mode of the user equipment.

The processor 71 is specifically configured to determine the corresponding trust level according to the current profile mode of the user equipment and the correspondence between each profile mode and each trust level.

The processor 71 is specifically configured to acquire profile mode-related parameter information.

The profile mode-related parameter information includes any one or a combination of current location information, current time information, current temperature information, illumination intensity information, or noise intensity information.

The processor 71 is further specifically configured to acquire the current profile mode of the user equipment according to the profile mode-related parameter information.

The processor 71 is further configured to configure a correspondence between each location area and each trust level.

The processor 71 is further configured to acquire a location area in which the user equipment is currently located.

The processor 71 is specifically configured to determine the corresponding trust level according to the location area in which the user equipment is currently located and the correspondence between each location area and each trust level.

The processor 71 is configured to divide each location area.

The processor 71 is specifically configured to divide each location area according to geographical location information, or the processor 71 is specifically configured to divide each location area according to a corresponding base station identifier, or the processor 71 is specifically configured to divide each location area according to an identifier of an accessed Wireless Fidelity WIFI network, or the processor 71 is specifically configured to divide each location area according to an identifier of a paired Bluetooth device, or the processor 71 is specifically configured to divide each location area according to a charging type.

The processor 71 is further configured to configure a correspondence between each environment impact factor and each trust level.

The environment impact factor is used to represent a degree to which identity authentication performed by the user equipment is affected by the surrounding environment, and a larger value of the environment impact factor is corresponding to a higher trust level.

The processor 71 is further configured to acquire a current environment impact factor of the user equipment.

The processor 71 is specifically configured to determine the corresponding trust level according to the current environment impact factor of the user equipment and the correspondence between each environment impact factor and each trust level.

The processor 71 is specifically configured to acquire environment impact factor-related parameter information.

The environment impact factor-related parameter information includes any one or a combination of current location information, current time information, current temperature information, illumination intensity information, or noise intensity information.

The processor 71 is further specifically configured to acquire the current environment impact factor of the user equipment according to the environment impact factor-related parameter information.

The processor 71 is specifically configured to: when the matching degree is greater than or equal to the matching threshold, determine that identity authentication succeeds; or the processor 71 is specifically configured to: when the matching degree is less than the matching threshold, determine that identity authentication fails.

The processor 71 is further configured to: when the matching degree is greater than or equal to the matching threshold, acquire an operation type corresponding to a current biometric feature.

The processor 71 is further configured to determine whether the operation type is the same as a preconfigured operation type.

The processor 71 is specifically configured to: when the operation type is the same as the preconfigured operation type, determine that identity authentication succeeds; or the processor 71 is specifically configured to: when the operation type is different from the preconfigured operation type, determine that identity authentication fails.

In this embodiment of the present invention, a manner of the biometric feature-based identity authentication is fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to the user equipment provided in this embodiment of the present invention, a scenario in which the user equipment is located is first detected; an authentication level corresponding to the scenario in which the user equipment is located is determined from at least two different authentication levels; then current biometric feature data entered by a user is acquired; and finally it is determined, according to the current biometric feature data, preconfigured biometric feature data, and the authentication level, whether identity authentication succeeds. In comparison with a prior-art manner of determining, by using a fixed matching threshold, whether identity authentication succeeds, in this embodiment of the present invention, a trust level of identity authentication by the user equipment in a current status or a current environment can be determined by using a current profile mode of the user equipment, or a location area in which the user equipment is currently located, or a current surrounding environment situation of the user equipment, and a corresponding matching threshold is further determined according to the trust level, so that when the surrounding environment is not favorable for user authentication, and the current environment is relatively safe, the matching threshold for authentication by the user equipment can be reduced, avoiding a case in which identity authentication needs to be repeated multiple times due to impact of a surrounding environment, and improving accuracy of identity authentication.

It should be noted that for other corresponding descriptions of devices in the user equipment provided in this embodiment of the present invention, refer to the corresponding description in FIG. 1 or FIG. 2. Details are not repeated herein.

Figure 8:
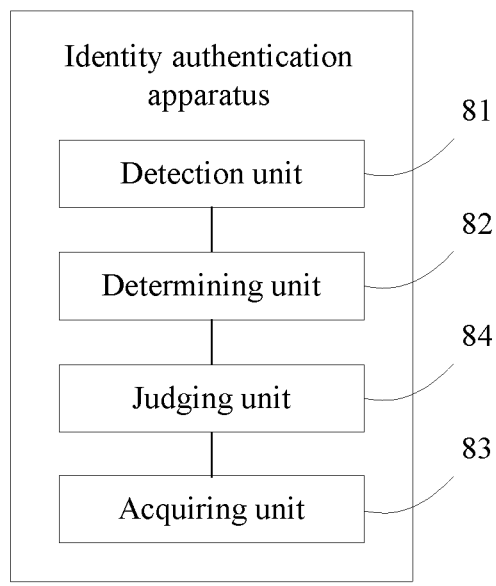
FIG. 8 is a schematic structural diagram of another identity authentication apparatus according to an embodiment of the present invention.

Further, in implementation of the methods shown in FIG. 3 and FIG. 4, an embodiment of the present invention further provides an identity authentication apparatus, where the apparatus may be used in user equipment, the user equipment has at least two different authentication manners, and the apparatus is configured to improve accuracy of identity authentication. As shown in FIG. 8, the apparatus includes a detection unit 81, a determining unit 82, an acquiring unit 83, and a judging unit 84.

The detection unit 81 is configured to detect a scenario in which the user equipment is located.

The determining unit 82 is configured to determine, from the at least two different authentication manners, a target authentication manner corresponding to the scenario in which the user equipment is located and that is detected by the detection unit 81.

The acquiring unit 83 is configured to acquire current biometric feature data used for the target authentication manner.

The judging unit 84 is configured to determine, according to the current biometric feature data acquired by the acquiring unit 83, and preconfigured biometric feature data that is corresponding to the target authentication manner determined by the determining unit 82, whether identity authentication succeeds.

The acquiring unit 83 is further configured to acquire authentication success rates respectively corresponding to the at least two different authentication manners in the scenario in which the user equipment is located.

The determining unit 82 is specifically configured to determine an authentication manner with a highest authentication success rate from the at least two different authentication manners as the target authentication manner according to the authentication success rates respectively corresponding to the at least two different authentication manners.

The acquiring unit 83 is specifically configured to acquire related parameter information respectively corresponding to the at least two different authentication manners in the scenario in which the user equipment is located.

The related parameter information includes any one or a combination of current location information, current time information, current temperature information, illumination intensity information, or noise intensity information.

The acquiring unit 83 is further specifically configured to acquire, according to the related parameter information respectively corresponding to the at least two different authentication manners, the authentication success rates respectively corresponding to the at least two different authentication manners.

The acquiring unit 83 is further configured to acquire current location information and current time information.

Figure 9:
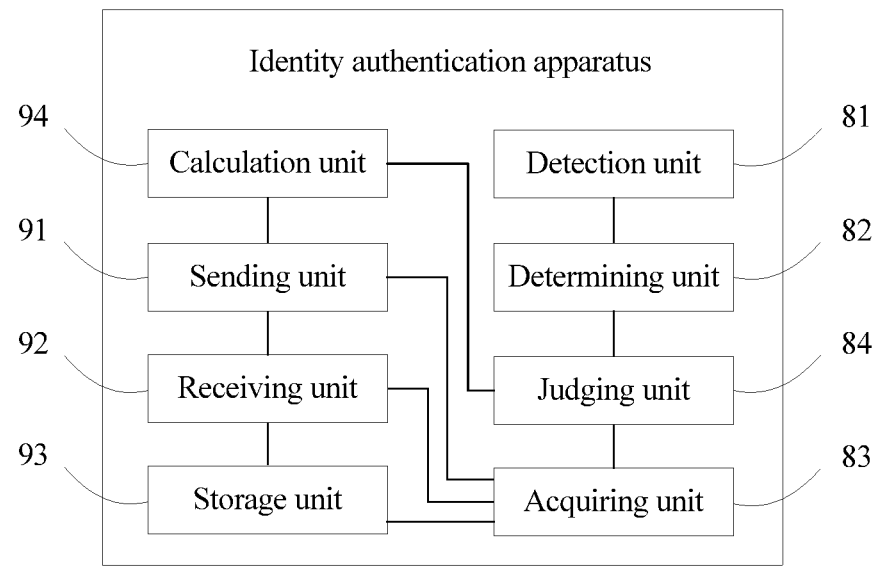
FIG. 9 is a schematic structural diagram of another identity authentication apparatus according to an embodiment of the present invention.

Further, as shown in FIG. 9, the apparatus further includes a sending unit 91 and a receiving unit 92.

The sending unit 91 is configured to send an authentication success rate request message to a server, where the authentication success rate request message carries the current location information and the current time information that are acquired by the acquiring unit 83, and the at least two different authentication manners.

The receiving unit 92 is configured to receive an authentication success rate response message sent by the server, where the authentication success rate response message carries the authentication success rates respectively corresponding to the at least two different authentication manners.

The acquiring unit 83 is specifically configured to acquire the authentication success rates respectively corresponding to the at least two different authentication manners from the authentication success rate response message received by the receiving unit 92.

Optionally, the apparatus further includes a storage unit 93.

The storage unit 93 is configured to store a correspondence between the scenario in which the user equipment is located and the authentication success rates respectively corresponding to the at least two different authentication manners.

Optionally, the apparatus further includes a calculation unit 94.

The calculation unit 94 is configured to calculate a matching degree between the current biometric feature data and the preconfigured biometric feature data corresponding to the target authentication manner.

The judging unit 84 is further configured to determine whether the matching degree is greater than or equal to a matching threshold corresponding to the target authentication manner.

The judging unit 84 is specifically configured to: when the matching degree is greater than or equal to the matching threshold, determine that identity authentication succeeds; or the judging unit 84 is specifically configured to: when the matching degree is less than the matching threshold, determine that identity authentication fails.

In this embodiment of the present invention, the at least two different authentication manners include any combination of fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to the identity authentication apparatus provided in this embodiment of the present invention, a scenario in which user equipment is located is first detected; a target authentication manner corresponding to the scenario in which the user equipment is located is determined from at least two different authentication manners; then current biometric feature data used for the target authentication manner is acquired; and finally it is determined, according to the current biometric feature data, and preconfigured biometric feature data corresponding to the target authentication manner, whether identity authentication succeeds. In comparison with a current manner of performing identity authentication only in one authentication manner, in this embodiment of the present invention, an authentication success rate corresponding to each authentication manner in a current scenario can be obtained through calculation by using parameter information related to a current status or a current environment, so that identity authentication can be performed for a user in an authentication manner with a highest authentication success rate in the current scenario, avoiding a case in which identity authentication needs to be repeated multiple times in some authentication manners due to impact of a surrounding environment, and improving accuracy of identity authentication.

It should be noted that for other corresponding descriptions of units in the identity authentication apparatus provided in this embodiment of the present invention, refer to the corresponding descriptions in FIG. 3 and FIG. 4. Details are not repeated herein.

Figure 10:
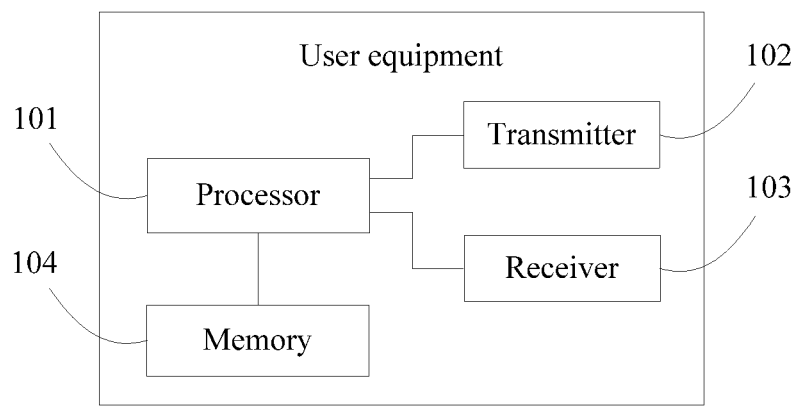
FIG. 10 is another schematic structural diagram of user equipment according to an embodiment of the present invention.

Still further, an embodiment of the present invention further provides user equipment, where the user equipment has at least two different authentication manners. As shown in FIG. 10, the user equipment includes a processor 101, a transmitter 102, a receiver 103, and a memory 104.

The processor 101 is configured to detect a scenario in which the user equipment is located.

The processor 101 is further configured to determine, from the at least two different authentication manners, a target authentication manner corresponding to the scenario in which the user equipment is located.

The processor 101 is further configured to acquire current biometric feature data used for the target authentication manner.

The processor 101 is further configured to determine, according to the current biometric feature data, and preconfigured biometric feature data corresponding to the target authentication manner, whether identity authentication succeeds.

The processor 101 is further configured to acquire authentication success rates respectively corresponding to the at least two different authentication manners in the scenario in which the user equipment is located.

The processor 101 is specifically configured to determine an authentication manner with a highest authentication success rate from the at least two different authentication manners as the target authentication manner according to the authentication success rates respectively corresponding to the at least two different authentication manners.

The processor 101 is specifically configured to acquire related parameter information respectively corresponding to the at least two different authentication manners in the scenario in which the user equipment is located.

The related parameter information includes any one or a combination of current location information, current time information, current temperature information, illumination intensity information, or noise intensity information.

The processor 101 is further specifically configured to acquire, according to the related parameter information respectively corresponding to the at least two different authentication manners, the authentication success rates respectively corresponding to the at least two different authentication manners.

The processor 101 is further configured to acquire current location information and current time information.

The transmitter 102 is configured to send an authentication success rate request message to a server.

The authentication success rate request message carries the current location information and the current time information that are acquired by the processor 101, and the at least two different authentication manners.

The receiver 103 is configured to receive an authentication success rate response message sent by the server, where the authentication success rate response message carries the authentication success rates respectively corresponding to the at least two different authentication manners.

The processor 101 is specifically configured to acquire the authentication success rates respectively corresponding to the at least two different authentication manners from the authentication success rate response message received by the receiver 103.

The memory 104 is configured to store a correspondence between the scenario in which the user equipment is located and the authentication success rates respectively corresponding to the at least two different authentication manners.

The processor 101 is further configured to calculate a matching degree between the current biometric feature data and the preconfigured biometric feature data corresponding to the target authentication manner.

The processor 101 is further configured to determine whether the matching degree is greater than or equal to a matching threshold corresponding to the target authentication manner.

The processor 101 is specifically configured to: when the matching degree is greater than or equal to the matching threshold, determine that identity authentication succeeds; or the processor 101 is specifically configured to: when the matching degree is less than the matching threshold, determine that identity authentication fails.

In this embodiment of the present invention, the at least two different authentication manners include any combination of fingerprint authentication, palmprint authentication, voiceprint authentication, voice authentication, iris authentication, retina authentication, face authentication, deoxyribonucleic acid DNA authentication, vein authentication, hand shape authentication, behavior authentication, or heart sound authentication.

According to the user equipment provided in this embodiment of the present invention, a scenario in which the user equipment is located is first detected; a target authentication manner corresponding to the scenario in which the user equipment is located is determined from at least two different authentication manners; then current biometric feature data used for the target authentication manner is acquired; and finally it is determined, according to the current biometric feature data, and preconfigured biometric feature data corresponding to the target authentication manner, whether identity authentication succeeds. In comparison with a current manner of performing identity authentication only in one authentication manner, in this embodiment of the present invention, an authentication success rate corresponding to each authentication manner in a current scenario can be obtained through calculation by using parameter information related to a current status or a current environment, so that identity authentication can be performed for a user in an authentication manner with a highest authentication success rate in the current scenario, avoiding a case in which identity authentication needs to be repeated multiple times in some authentication manners due to impact of a surrounding environment, and improving accuracy of identity authentication.

It should be noted that for other corresponding descriptions of devices in the user equipment provided in this embodiment of the present invention, refer to the corresponding description in FIG. 3 or FIG. 4. Details are not repeated herein.

The identity authentication apparatus and the user equipment provided in the embodiments of the present invention may implement the foregoing method embodiments; for specific function implementation, refer to the descriptions of the method embodiments. Details are not repeated herein. The identity authentication method and apparatus, and the user equipment provided in the embodiments of the present invention may be applicable to user identity authentication, but are not limited thereto.

A person of ordinary skill in the art may understand that all or some of the procedures of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    detecting, by a user equipment, a scenario in which the user equipment is located;
    configuring, in response to the scenario in which the user equipment is located being a surrounding environment of the user equipment, a correspondence between a plurality of environment factors, and a plurality of trust levels, wherein each environment impact factor of the plurality of environment factors represents a degree to which identity authentication performed by the user equipment is affected by the surrounding environment, and wherein a first environment impact factor of the plurality of environment impact factors corresponds to a first trust level of the plurality of trust levels in response to a value of the first environment impact factor being a first value, wherein a second environment impact factor corresponds to a second trust level of the plurality of trust levels that is lower than the first trust level in response to a value of the second environmental impact factor being a second value that is lower than the first value;
    acquiring, by the user equipment, a current environment impact factor of the user equipment from the plurality of environment impact factors;
    determining, by the user equipment, a trust level corresponding to the scenario in which the user equipment is located from the plurality of trust levels and according to the current environment impact factor of the user equipment and a correspondence between the current environment impact factor and the trust level;
    determining, by the user equipment, from at least two different matching thresholds of the user equipment, a matching threshold corresponding to the trust level;
    acquiring, by the user equipment, current biometric feature data entered by a user; and
    determining, by the user equipment, according to a matching degree between the current biometric feature data and preconfigured biometric feature data, and the matching threshold, whether identity authentication succeeds.

2. The method according to claim 1, wherein the scenario in which the user equipment is located comprises at least one of a profile mode, a location, or a surrounding environment of the user equipment.

3. The method according to claim 2, further comprising:
    configuring the correspondence between each trust level and each matching threshold, wherein the trust level represents a degree to which the user is trusted in a current scenario, wherein the matching threshold determines whether identity authentication succeeds, and wherein a first trust level, that is higher than a second trust level, corresponds to a first matching threshold, that is lower than a second matching threshold corresponding to the second trust level.

4. The method according to claim 2, wherein the method further comprises performing, when the scenario in which the user equipment is located is the profile mode of the user equipment:
    configuring a correspondence between each profile mode and each trust level;
    wherein the method further comprises performing, before determining the trust level corresponding to the scenario in which the user equipment is located:
        acquiring a current profile mode of the user equipment; and
    wherein determining the trust level corresponding to the scenario in which the user equipment is located comprises:
        determining the trust level according to the current profile mode of the user equipment and the correspondence between each profile mode and each trust level.

5. The method according to claim 4, wherein acquiring the current profile mode of the user equipment comprises:
acquiring profile mode-related parameter information, wherein the profile mode-related parameter information comprises one or more of current location information, current time information, current temperature information, illumination intensity information, or noise intensity information; and
acquiring the current profile mode of the user equipment according to the profile mode-related parameter information.

6. The method according to claim 2, wherein the method further comprises performing, when the scenario in which the user equipment is located is the location of the user equipment:
configuring a correspondence between each location area and each trust level;
wherein the method further comprises performing, before determining the trust level corresponding to the scenario in which the user equipment is located:
acquiring a location area in which the user equipment is currently located; and
wherein determining the trust level corresponding to the scenario in which the user equipment is located comprises:
determining the trust level according to the location area in which the user equipment is currently located and the correspondence between each location area and each trust level.

7. The method according to claim 6, wherein the method further comprises performing, before configuring the correspondence between each location area and each trust level:
dividing each location area; and
wherein the dividing each location area comprises performing at least one of:
dividing each location area according to geographical location information;
dividing each location area according to a corresponding base station identifier;
dividing each location area according to an identifier of an accessed Wireless Fidelity (WiFi) network;
dividing each location area according to an identifier of a paired Bluetooth device; or
dividing each location area according to a charging type.

8. The method according to claim 2, wherein acquiring the current environment impact factor of the user equipment comprises:
acquiring environment impact factor-related parameter information, wherein the environment impact factor-related parameter information comprises at least one of current location information, current time information, current temperature information, illumination intensity information, or noise intensity information; and
acquiring the current environment impact factor of the user equipment according to the environment impact factor-related parameter information.

9. The method according to claim 2, wherein determining whether identity authentication succeeds comprises performing at least one of:
determining that identity authentication succeeds in response to the matching degree exceeding or equaling the matching threshold; or
determining that identity authentication fails in response to the matching degree being less than the matching threshold.

10. The method according to claim 2, wherein determining whether identity authentication succeeds comprises:
acquiring an operation type corresponding to a current biometric feature when the matching degree exceeds or equals the matching threshold, and determining whether the operation type equates to a preconfigured operation type;
determining that identity authentication succeeds in response to the operation type equates to the preconfigured operation type; and
determining that identity authentication fails in response to the operation type differing from the preconfigured operation type.

11. A method, comprising:
detecting, by a user equipment, a scenario in which the user equipment is located;
acquiring current location information and current time information;
sending an authentication success rate request message to a server, wherein the authentication success rate request message carries the current location information, the current time information, and at least two different authentication manners;
receiving an authentication success rate response message sent by the server, wherein the authentication success rate response message carries a plurality of authentication success rates respectively corresponding to the at least two different authentication manners; and
determining, by the user equipment, from the at least two different authentication manners of the user equipment, according to the plurality of authentication success rates respectively corresponding to the at least two different authentication manners, a target authentication manner corresponding to the scenario in which the user equipment is located;
acquiring current biometric feature data used for the target authentication manner; and
determining, according to the current biometric feature data, and preconfigured biometric feature data corresponding to the target authentication manner, whether identity authentication succeeds;
wherein determining the target authentication manner corresponding to the scenario in which the user equipment is located comprises:
acquiring, from the authentication success rate response message, the plurality of authentication success rates respectively corresponding to the at least two different authentication manners in the scenario in which the user equipment is located;
determining a highest authentication success rate of the plurality of authentication success rates, wherein the highest authentication success rate exceeds or equals each remaining authentication success rate of the plurality of authentication success rates; and
determining an authentication manner of the at least two different authentication manners corresponding to the highest authentication success rate as the target authentication manner.

12. The method according to claim 11, wherein acquiring the plurality of authentication success rates comprises:
acquiring related parameter information respectively corresponding to the at least two different authentication manners in the scenario in which the user equipment is located, wherein the related parameter information comprises at least one of current location information, current time information, current temperature information, illumination intensity information, or noise intensity information; and acquiring, according to the related parameter information respectively corresponding to the at least two different authentication manners, the plurality of authentication success rates respectively corresponding to the at least two different authentication manners.

13. The method according to claim 11, wherein the method further comprises performing, after acquiring the plurality of authentication success rates:

storing a correspondence between the scenario in which the user equipment is located and the plurality of authentication success rates respectively corresponding to the at least two different authentication manners.

14. The method according to claim 11, wherein determining whether identity authentication succeeds comprises:

calculating a matching degree between the current biometric feature data and the preconfigured biometric feature data corresponding to the target authentication manner;

determining whether the matching degree exceeds or equates to a matching threshold corresponding to the target authentication manner;

determining that identity authentication succeeds in response to the matching degree exceeding or equating the matching threshold; and determining that identity authentication fails in response to the matching degree being less than the matching threshold.

15. The method according to claim 11, wherein the at least two different authentication manners comprise at least one of fingerprint authentication, palmprint authentication, voiceprint authentication, voice authentication, iris authentication, retina authentication, face authentication, deoxyribonucleic acid (DNA) authentication, vein authentication, hand shape authentication, behavior authentication, or heart sound authentication.

16. A user equipment, comprising:

a processor; and a non-transitory computer-readable storage medium storing a program that, when executed by the processor, cause the user equipment to:

detect a scenario in which the user equipment is located;

acquire current location information and current time information;

send an authentication success rate request message to a server, wherein the authentication success rate request message carries the current location information, the current time information, and at least two different authentication levels;

receive an authentication success rate response message sent by the server, wherein the authentication success rate response message carries authentication success rates respectively corresponding to the at least two different authentication levels; and determine, from the at least two different authentication levels, according to the authentication success rates, an authentication level corresponding to the scenario in which the user equipment is located;

acquire current biometric feature data entered by a user; and determine, according to the current biometric feature data, preconfigured biometric feature data, and the authentication level, whether identity authentication succeeds;

wherein the program causing the user equipment to determine the authentication level corresponding to the scenario in which the user equipment is located comprises the program causing the user equipment to:

acquire, from the authentication success rate response message, the authentication success rates;

determine a highest authentication success rate of the authentication success rates, wherein the highest authentication success rate exceeds or equals each remaining authentication success rate of the authentication success rates; and determine an authentication level of the at least two different authentication levels corresponding to the highest authentication success rate as the authentication level.

* * * * *